United States Patent
Wilson et al.

(10) Patent No.: US 10,242,117 B2
(45) Date of Patent: Mar. 26, 2019

(54) ASSET DATA COLLECTION, PRESENTATION, AND MANAGEMENT

(75) Inventors: Robert A. Wilson, Oxford, MI (US); Bernard E. Mamon, Rochester, MI (US); Douglas J. Vos, Dearborn, MI (US); Dwayne G. Ridenour, Walled Lake, MI (US); Beverly E. Grau, Dearborn, MI (US); Kathleen J. Hill, Madison Heights, MI (US); Steven E. Hodgins, Rochester Hills, MI (US); Anthony S. Abraham, Grosse Pointe Woods, MI (US); Shelley A. Mannino, Grand Ledge, MI (US); Jessica Elston, Albion, MI (US); Darren Kelly, Winchester, KY (US); John Scamehorn, Viera, FL (US)

(73) Assignee: Ent. Services Development Corporation LP, Houston, TX (US)

( * ) Notice: Subject to any disclaimer, the term of this patent is extended or adjusted under 35 U.S.C. 154(b) by 2146 days.

(21) Appl. No.: 11/856,675

(22) Filed: Sep. 17, 2007

(65) Prior Publication Data

US 2008/0086345 A1 Apr. 10, 2008

Related U.S. Application Data

(60) Provisional application No. 60/825,889, filed on Sep. 15, 2006.

(51) Int. Cl.
*G06F 17/30* (2006.01)
*G06Q 10/06* (2012.01)

(52) U.S. Cl.
CPC ....... *G06F 17/3089* (2013.01); *G06Q 10/063* (2013.01)

(58) Field of Classification Search
USPC .......................................................... 705/7
See application file for complete search history.

(56) References Cited

U.S. PATENT DOCUMENTS

| | | | |
|---|---|---|---|
| 5,867,823 A * | 2/1999 | Richardson | 705/7.13 |
| 5,945,919 A * | 8/1999 | Trask | 340/825.49 |
| 6,138,139 A * | 10/2000 | Beck et al. | 709/202 |
| 6,341,310 B1 * | 1/2002 | Leshem | G06F 11/32 707/E17.116 |
| 6,418,416 B1 * | 7/2002 | Rosenberg et al. | 705/28 |
| 6,633,900 B1 * | 10/2003 | Khalessi et al. | 709/202 |
| 6,714,913 B2 * | 3/2004 | Brandt et al. | 705/2 |
| 6,732,100 B1 * | 5/2004 | Brodersen et al. | |
| 6,978,006 B1 * | 12/2005 | Polcyn | 379/265.12 |
| 7,243,138 B1 * | 7/2007 | Majkut | G06F 17/30415 707/999.003 |
| 7,870,045 B2 * | 1/2011 | Yagishita | 705/35 |
| 2001/0051890 A1 * | 12/2001 | Burgess | 705/9 |
| 2002/0029161 A1 * | 3/2002 | Brodersen et al. | 705/9 |

(Continued)

*Primary Examiner* — Leland Marcus
(74) *Attorney, Agent, or Firm* — Sheppard Mullin Richter & Hampton LLP

(57) ABSTRACT

Systems and methods for asset data collection, presentation, and management. In one general aspect, a Web portal provides a centralized end-to-end view of IT operations of an organization. The portal may, for example, provide an organization's view of operations and asset data. Visibility of accurate data on an organization-wide scale allows managers to spot issues immediately, respond quickly, and offer continuous improvement.

20 Claims, 27 Drawing Sheets

(56) References Cited

U.S. PATENT DOCUMENTS

| | | | |
|---|---|---|---|
| 2002/0049626 A1* | 4/2002 | Mathias et al. | 705/10 |
| 2002/0194097 A1* | 12/2002 | Reitz | 705/36 |
| 2002/0198984 A1* | 12/2002 | Goldstein | G06F 11/323 709/224 |
| 2002/0198985 A1* | 12/2002 | Fraenkel | G06F 11/3419 709/224 |
| 2003/0036983 A1* | 2/2003 | Hougen et al. | 705/28 |
| 2003/0101108 A1* | 5/2003 | Botham et al. | 705/28 |
| 2003/0135439 A1* | 7/2003 | Yagishita | 705/36 |
| 2003/0191911 A1* | 10/2003 | Kleinschnitz, Jr. | G06F 17/30286 711/154 |
| 2003/0204450 A1* | 10/2003 | Heinrichs et al. | 705/28 |
| 2003/0225650 A1* | 12/2003 | Wilson et al. | 705/36 |
| 2004/0078257 A1* | 4/2004 | Schweitzer et al. | 705/9 |
| 2006/0195566 A1* | 8/2006 | Hurley | H04L 41/0853 709/224 |
| 2008/0004937 A1* | 1/2008 | Chow | G06Q 30/02 715/772 |
| 2008/0046311 A1* | 2/2008 | Shahine et al. | 705/14 |

\* cited by examiner

FIG. 8

Patch Activity Detail - Last Updated: DATE AND TIME

| GW05-007 | 71.22% | | | | | Target | MM/DD/YYYY HH:MM |
|---|---|---|---|---|---|---|---|
| Vendor: | Other | | Title: Catalyst Worm impacting web hosting environments | | | | Comment Last Updated: |
| | | Impacted: | Completed: | Remaining: | Expected Completion: | First Reported: | |
| | | 92448 | 65844 | 26604 | | | |
| North America - ABC-Can | 100.00% | 3546 | 3546 | 0 | | | |
| North America - ABC-MEX | 87.92% | 68903 | 60583 | 8320 | | | |
| North America - ABC-US | 6.70% | 17892 | 1200 | 16692 | | | |

Summary:

Threat Level: High

Description: A vulnerability exists within the Web Hosting environment that could allow an unauthenticated remote attacker to trigger the Catalyst Worm which causes the affected service to restart. A sustained attack would effectively prevent remote access to the affected system. Version X Bulletin updated to reflect the fact that this vulnerability affects all web server platforms Published: MM/DD/YYYY
Impacted devices: 92448
Completed: 65844

Problem Management

Service Management  Main  Help  Feedback

| Asia Pacific | Europe | LAMM | North America | Global | Consoles |
|---|---|---|---|---|---|
| Adelaide 5:47:32 [+09:30] | Rüsselsheim 22:17:32 [+02] North America | Sao Paulo 17:17:32 [-03] | Detroit 16:17:32 [-04] | UTC 20:17:32 [0] | Service Desk<br>Incident Management<br>Change Management<br>Security Management<br>Patch Management<br>Problem Management<br>Global Insight |

Color codes:  Red  Green  Purchasing

Place your mouse over an icon to view a description of the indicator.

19879 - Application - Research / Analysis Inconclusive

| | |
|---|---|
| Vendor: | XYZ |
| Incident Location: | North America |
| Incident Impact Description: | None of the Widget Dealers could access the Widget Catalog application to order more Widgets. Manual processes have been instituted to deal with widget ordering (fax, vme) however there is a backlog and orders are taking 2 + days longer to process. The Catalyst Worm appears to be the issue within the Web Hosting environment. Technicians have been called to the site to determine what needs to be done. John Doe has contacted security to find out of a patch has been created to deal with removal and remediation of the Catalyst Worm outbreak. |
| Region: | North America |
| PTT Record ID: | 19879 |
| PTT Record Status: | Open |
| Impact Type: | Lost Sales |
| Incident Reported Date: | YYYY-MM-DD  HH:MM:SS |
| Business Impact Start Date: | YYYY-MM-DD  HH:MM:SS |
| Business Impact End Date: | YYYY-MM-DD  HH:MM:SS  North America |
| Sector Group: | XYZ- Supply Chain - North America |
| Process Area: | Supply Chain |

[Problem Details]

Design and Research
Global Services
Manufacturing
Marketing / Sales
Product Development
Purchasing

FIG. 23

Service Desk

The Service Desk is a function within Service Management that facilitates the completion of user requests according to the SLAs utilizing the Service Support and Service Delivery processes. Click on any number that appears in the table below to view a detailed list of reports that are currently available for that category.

| Region | Real Time | Daily | Weekly | Monthly | Yearly |
|---|---|---|---|---|---|
| Asia Pacific | | 1 | 8 | 21 | |
| Europe | | (25) | 13 | 18 | |
| Global | | | | 7 | |
| Latin America | | | 5 | 21 | |
| Middle East | | | | 80 | |
| North America | | 22 | 14 | 63 | |

Service Desk
Service Desk Console
ABC Daily Status
Weekly ABCCo North America Top 10 Product Chart

FIG. 25 welcome

| home | my global insight | service performance | analytics | metrics | health checks |

ABC Corporation about
contact

[Search box] Search
Advanced Search

ABC Related Links
No Content is available for this content category.

The information contained in this section is organized by the major regions and business sectors that comprise the ABC Corporation Organization around the globe. Click on any number that appears in the table below to view a detailed list of reports that are currently available for that category.

| ABC Corp Lines of Business | Real Time | Daily | Weekly | Monthly | Yearly |
|---|---|---|---|---|---|
| Marketing | 2 | | | 3 | 98 |
| Business Services | 1 | 1 | | | 35 |
| Product Development | 3 | | 32 | | 46 |
| Information Services | | | | | |
| Manufacturing | 61 | 1 | 31 | 124 | |
| Accounting | | 1 | 139 | 72 | |
| Customer Services | | | | | 27 |
| Strategic Planning | | | | | |
| Human Resources | | | | | |
| Purchasing | | | | | |
| Finance | | | | | |
| Legal | | | | | |
| Communication Services | 12 | 56 | 343 | 1063 | 1 |

FIG. 26 welcome home | my global insight | service performance | analytics | metrics | health checks

Service Offerings

Search
Advanced Search

Service Excellence Summary

EDS Related Links
XYZ ABC Service Delivery
InfoCentre
XYZ.com
e-Operational Review
XYZ ABC Global Delivery Transformation (GDT)
XYZ ABC Knowledge Center
XYZ Global Alliances
Enterprise Document Delivery
Productivity Task Force - Update Presentations The information on this page is organized by the collection of packaged XYZ capabilities that are designed and offered to serve specific customer needs and requirements. Click on any number that appears in the table below to view a detailed list of reports that are currently available for that category.

Service Offerings

| | Real Time | Daily | Weekly | Monthly | Yearly |
|---|---|---|---|---|---|
| ATK - Strategy | | | | | |
| Application Hosting Services | | | | 25 | |
| Applications Development Services | | 1 | 6 | 270 | |
| Applications Outsourcing Services | 75 | 31 | 273 | 664 | 1 |
| Business Exchange Services | | | | 9 | |
| Client Specific - ASB Environment Availability - PMP | | | 4 | | |
| Client Specific - Gross Lost Product Units - PMP | | | 9 | 2 | |
| Client Specific - Help Desk User Satisfaction - PMP | | | 2 | | |
| Client Specific - IT Integrity | | | 8 | 46 | |
| Client Specific - Lost Engineering Productivity in Hours - PMP | | | 27 | 4 | |
| Client Specific - Net Lost Units Due to IT - PMP | | | 10 | 1 | |
| Client Specific - Overall Average Availability of Critical Sys - PMP | | | | 5 | |
| Client Specific - Percent of PCs Delivered in 10 Days - PMP | | | | 1 | |
| Client Specific - Remote Laptop Connectivity - PMP | | | | 1 | |
| Client Specific - Video Conferencing Uptime Performance - PMP | | | 49 | | |

FIG. 27

ASSET DATA COLLECTION, PRESENTATION, AND MANAGEMENT

CLAIM OF PRIORITY

This application claims priority under 35 USC § 119(e) to U.S. Provisional Patent Application Ser. No. 60/825,889, filed on Sep. 15, 2006, the entire contents of which are hereby incorporated by reference.

BACKGROUND

As organizations continue to expand their operations, their ability to manage their assets (e.g., computers, servers, networks, software, and manufacturing equipment) becomes more difficult. This is due not only to the increased number of assets to be managed but also to the varying types of assets. For instance, assets that perform similar functions for the organization may not natively provide similar data for analyzing performance and health of the assets. This may make attempting to centrally analyze and/or manage the assets difficult.

Even the reporting of the operational condition, much less problems, with assets in a decent sized organization can be cumbersome. For example, daily operational "health checks" or production-readiness assessments may be assessed using time consuming methods of cascaded emails and voicemail messages and meetings just to report the once-daily status. These cascaded messages are difficult to manage, let alone respond to when problems occur.

If organizations begin to expand beyond their national borders, or even around the world, managing the assets from a central location is difficult because of the vast discrepancies in time zones. Thus, assets may need to be in operation while the central management is asleep. The expansion beyond national borders may also further exacerbate the problem of assets not providing similar data for analyzing performance and health of the assets. For example, a company may need to support its information technology (IT) system by collecting and analyzing data on hardware, software, and networks across hundreds of production environments in tens of countries. In such an environment, it could take days to answer relatively simple questions like: how many laptops are three years old, what incidents are affecting production, or what regional changes affect other regions. Moreover, based on the systems used to gather information, the answers sought could differ each time.

SUMMARY

Systems, processes, and apparatus for collect, present, and/or manage asset data. In one general aspect, a Web portal allows a centrally organized end-to-end view of IT operations of an organization to be presented. The portal may, for example, provide a business view of the operations and enterprise information.

In various implementations, a web portal is generated to provide real-time access to asset data across one or more organizations. The asset data includes information about assets for at least one of the organizations. The web portal includes links to service management consoles, a dashboard, and a report upload interface that allows a user to upload reports related to the asset data. A selection of a link to a service management console presents a service management console. Each service management console retrieves asset data for a category of service management related to the service management console for a specified time period, analyzes the asset data, and generates an interface to present the asset data to a user. The dashboard includes an interface that includes an overview of asset data. The dashboard includes indicia indicative of the status of at least one of incidents related to assets or corrective action related to incidents.

Various implementations may include one or more of the following. Analyzing the asset data may include identifying the units for the asset data and generating the asset data in similar units. The asset data for one of the organizations may be categorized with respect to geographic region that the asset data is related to and the categorized asset data may be presented based on geographic region. The asset data for one of the organizations may be categorized with respect to organizational unit within the organization that the asset data is related to and the categorized asset data may be presented based on geographic region. The indicia may include indicia indicative of the status of at least one of regional changes, virus compliance, or virus vulnerabilities. Access to at least a portion of the asset data may be restricted based on user information, where a user may provide user information prior to accessing the web portal. A user interface may be generated that presents the web portal to a user, one or more commands may be received from a user to alter the presentation of asset data in a service management console, and the presentation of asset data in the user interface may be altered. The indicia may be presented on a map. The indicia may indicate the status for at least one of incidents related to assets or corrective action related to incidents for one or more geographic regions associated with at least one of the organizations. A user interface may be generated that presents the web portal to a user and a selection of a link to one of the service management consoles may be received. The service management console may present asset data related to the service management console, where the asset data is categorized. A link to one or more of the categories of asset data on the service management console may be generated, a selection of one of the categories of asset data may be selected, and an interface including a more detailed view of the asset data in the category may be generated. At least one of the service management consoles may include an incident management console, a problem management console, a change management console, a patch management console, a security management console; or a service desk console. A user interface may be generated that presents one of the service management consoles to a user, and links to one or more other service management consoles may be generated in the presented service management console interface. Report uploading on the report upload interface may be restricted based on user information, where a user provides user information prior to accessing the web portal. A report may be received from a user through the report upload interface, where the report is associated with one of the service management console. The report may be stored. A search query related to reports may be received and reports accessible in the web portal may be analyzed based on terms of the search query. A listing of reports satisfying the search query for presentation to the user may be generated. Reports uploaded through the report upload interface may be analyzed to identify users who have not uploaded required reports, and a message may be transmitted to the identified users. The web portal may provide real-time access to asset data across a plurality of organizations. The asset data may be categorized based on organization, and a user interface to present the asset data to a user may be generated based on the organization.

In another aspect, a system may manage assets for an organization and may provide access to asset data across one or more organizations. The asset data includes information about assets for at least one of the organizations. The system includes a web portal. The web portal includes links to service management consoles, a dashboard, and a report upload interface. A selection of a link presents a service management console. Each service management consoles retrieves asset data for a category of service management related to the service management console and for a specified time period, analyzes the asset data, and generates an interface to present the asset data to a user. The dashboard includes an interface. The interface includes an overview of asset data. The dashboard also includes indicia indicative of the status of at least one of the incidents related to assets or corrective action related to incidents. The report upload interface allows a user to upload reports related to the asset data.

Various implementations may include one or more of the following. The web portal may include an interface for at least one of the service management consoles. At least one of the service management consoles may include an incident management console, a problem management console, a change management console, a patch management console, a security management console, or a service desk console. The web portal may include a map. The indicia may be presented on a map. The indicia may indicate the status for at least one of incidents related to assets or corrective action related to incidents for one or more geographic regions associated with at least one of the organizations.

Various implementations may have one or more features. The visibility of accurate data on an organization-wide scale may allow managers to see issues readily, respond quickly, and/or offer continuous improvement. The portal may even provide for the management of subcontractors, partners, and/or suppliers. The portal may provide a fast, factual, and comprehensive view of the hardware and software the client has across its organization as well as a view of multiple vendors. This portal may also provide a clearer operational perspective of an organization. Data may be displayed by region or organization units, and data may be searched by the services provided to the company by third parties, such as application development and management, business process outsourcing, or data center services. The portal may allow a manager outside of the organization to manage the system by comparing factual, real-time performance results to the organization's requirements. The portal may transform the way outside managers and managers within an organization provide services from—reactive to proactive. Asset data processes and systems may also allow a user to view the status of regional changes, virus compliance and vulnerabilities, and root-cause analysis for problem solving. Thus, systems and processes may further provide up-to-date data about an organization's IT assets. Problems and other events may be tracked and managed throughout the service management processes and lifecycles to see how IT events may be resolved. This may improve both resolution speed and overall client service satisfaction. Organization and operations data may be included under one rubric. By realigning processes, IT service delivery may be transformed, which may result in changes in organizational behavior. IT support staff and operational costs may be reduced using the systems and processes and/or a higher level of service excellence in delivering IT products and services throughout an organization may be achieved. Asset data processes and systems may allow an organization to manage the performance of the system to the company's requirements; eliminate differences and discrepancies in support; produce standardized work that is consistent, predictable, repeatable and measurable; work as one team with one direction in support of a company; and/or transform the way an organization is operating.

The details of one or more implementations are set forth in the accompanying drawings and the description below. Other features will be apparent from the description and drawings, and from the claims.

DESCRIPTION OF DRAWINGS

FIG. 8 illustrates a screenshot of an example of a change management console of a global visualization system.

FIG. 10 illustrates a screenshot of an example of a patch detail view of a global visualization system.

FIG. 13 illustrates a screenshot of an example of a security management console of a global visualization system.

FIG. 17 illustrates a screenshot of an example of a of a page on the analytics view of a global visualization system.

FIG. 23 illustrates an expanded view of a record in the problem management console of FIG. 22.

FIG. 25 illustrates a screenshot of an example of a detailed metrics service desk view of a global visualization system.

FIG. 26 illustrates a screenshot of an example of a detailed metrics corporate organizational unit view of a global visualization system.

FIG. 27 illustrates a screenshot of an example of a detailed metrics service offerings view of a global visualization system.

Like reference symbols in the various drawings indicate like elements.

DETAILED DESCRIPTION

Figure 1:
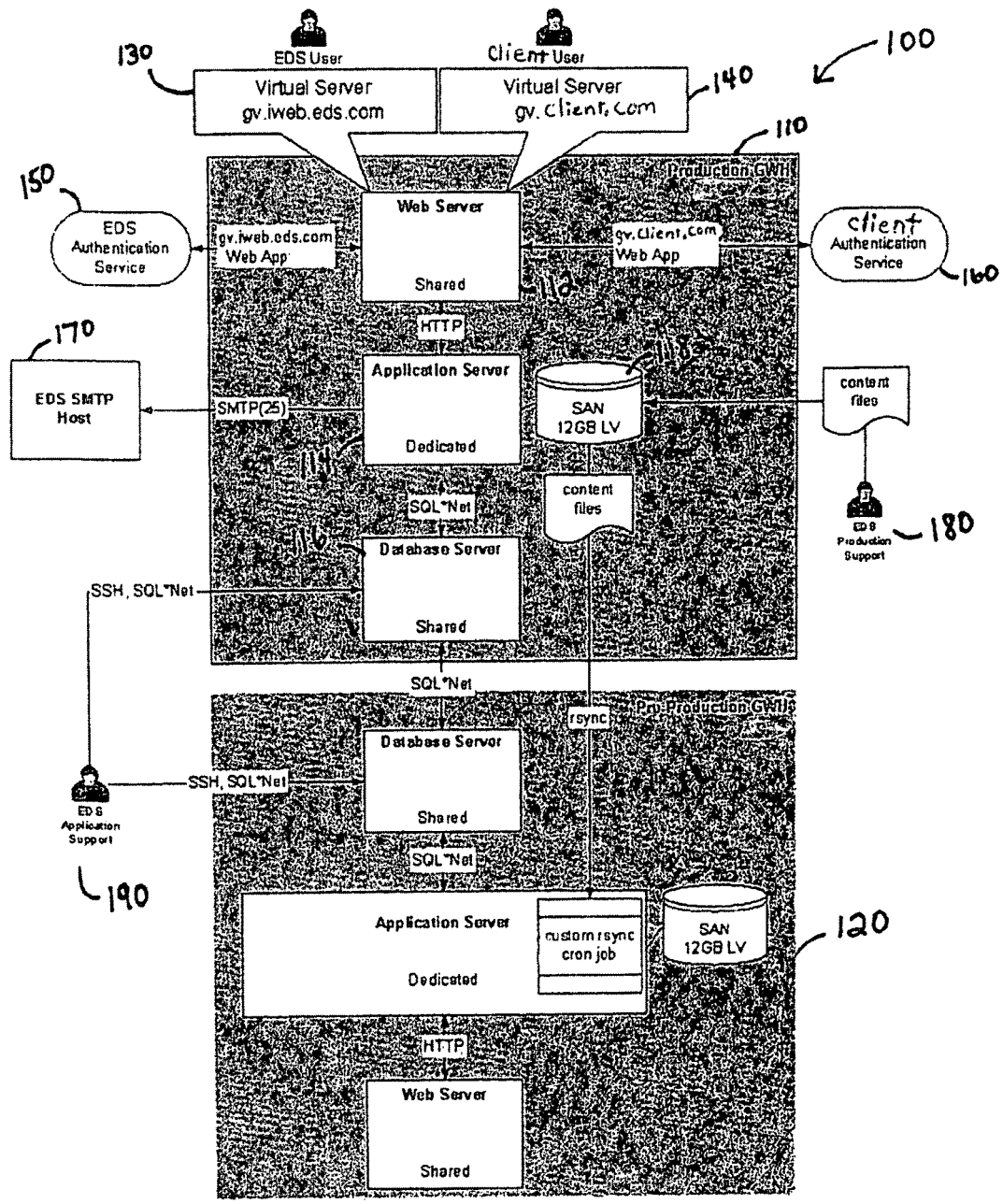
FIG. 1 is a block diagram illustrating one implementation of a system for asset data collection, presentation, and management.

The current disclosure relates to asset data collection, presentation, and management. In particular implementations, the asset data collection, presentation, and management may be provided by a Web portal of the global visualization system. The Web portal may provide visualization operations across an organization (e.g., a company) by, for example, using a business presentation layer for key global operations and enterprise information allowing client teams to manage business on a real-time basis by viewing the factual results of their performance to client requirements.

Because IT events impact business on a daily basis the Web portal may provide tracking and/or management of those events throughout the service management processes and lifecycles to view what is being done to remediate the event, resulting in improved speed to resolution and improved service. With the constant visibility that the portal may provide, observations and actions can be undertaken in a cycle of continuous improvement.

A portal may present various types of data (e.g., asset data). For example, at its top level, a portal may present service performance data, which may allow event correlation and business impact visualization. The portal may also present links to service management consoles, which may show real-time multiple vendor data for incident, change, problem, security, etc., a high-level summary of daily health checks for key organizational sites and data centers, with links to a consolidated detail page, service level agreement metrics and reporting information in context of an IT framework, organization, and/or offering, and asset analytics.

The health (e.g., condition) of various assets in the organization may be presented in a variety of manners. In one implementation, it may be provided in an automated presentation that a manager can click and update quickly, managers can see and use the current data. Health checks may also be sent to remote device (e.g., laptops, cellular phones, personal digital assistants, etc.).

To more fully support service management, the portal may provide various management consoles to provide a high-level overview into each process area, such as those specified by the Information Technology Infrastructure Library (ITIL). For example, the portal may have an incident management console, a service desk console, a change management console, a security management console, an availability management console, a patch management consoles, and a problem management console, an action-item management console, a release management console, a capacity management console, and/or an IT service continuity management console.

The consoles may retrieve data for a specified period of time (e.g., all data to present, last week, etc.) and may analyze the data based on business and/or industry rules (e.g., ITIL framework). The web portal and/or the console may identify units of the retrieved data and standardize the units and/or format of the data for presentation to the user. The standardization of the data and/or format may facilitate data comprehension and data analysis by a user to whom the data is presented. The consoles may provide real-time or current access to data. For example, the consoles may retrieve data periodically (e.g., every hour, every minutes, etc.) to provide real-time access to data. Real-time access to data may facilitate management and improve assessments made based on the data.

An incident management console may provide real-time tracking of outages (e.g., Severity 1 Outages) updated by the information captured by a service desk. The tracking may be an operational improvement to existing real-time operation reports. The views may improve the arrangement, accessibility and functionality of executive overviews for outages impacting key environments (e.g., production environments). It may also provide a real-time view of the open and closed incidents for a period of time (e.g., the past 2 business days).

A service desk console may provide data is that is a given time period old (e.g., 24 hours old) and manually input. It may provide a view of each help desk contract in each region, the number of total calls taken during the time period, the top call types in each contract, and any virus related call volume.

A change management console may be at least partially based on an enterprise change management tool. The console may provide approved pending changes, successful and unsuccessfully completed changes, and pending or on hold changes.

A security management console may provide key data to managers such as security operational stakeholders, who can then act on the data to manage the level of security risk. This data and/or the way it is being presented may supplement security-related data available on other consoles and portals. The security management console may provide a real-time pulse of the state of security by showing some or all of global security problems (e.g., patches), minimum signature files and email stripping info, service-desk virus ticket trends, symantec briefs, and security related incidents.

An availability management console may provide a high level view of availability for critical applications. Features of the console may include monthly regional measurement of critical application availability, possibly displayed in a chart format.

A patch management console may provide a structured method for reporting the status of patching activity. The process may interface with local support procedures to ensure a consistent method for data collection and timely reporting of patching results. The console may allow patches to be archived, reducing the number of patches displayed in the main view on the console. The console may include a detail page, which may show regions and top level organizations first with drill down. The drill down may allow multiple organizational levels to be delved into to get to the lowest level of detail, where comments may be entered regarding the status of the patch. Internal and/or supplier patching status may also be tracked. The detail page may show organizations required to report on the patching activity. Detail groupings may be assigned a start and an end date to better align them with a patch's start and target dates. This may reduce the number of patches that organizations have to report on to only those that are active during the same timeframe the detail grouping is active. The console may also allow for reports regarding patches to be performed. Generating reports may include allowing for selection criteria and/or outputting an overview report of the patches on the console. A report may also include comment information. In some implementations, the console may be part of a security management console.

A problem management console may provide an overview for problem data impacting the infrastructure. The problem management console may include displays of current problem data from a problem tracking tool (PTT) color indicators such as indicators in red, yellow and green to show status of root cause determination for problems. Lessons learned may also be available, on regional pages, for example, for tracking and referencing during the problem review process.

An action-item management console may allow creation of an electronic record of action items generated by managers. The action-item management console may also allow tracking of actions taken by suppliers to complete and close action items. The action-item management console may include the ability to search, access, and report upon current and past action items from some or all of the consoles.

A release management console may provide a view of release compliance for a key set of applications. Features of the release management console may include reporting on data currently collected in a release compliance and indicators, such as a red, yellow, and green indicators to show application compliance to release standards.

A capacity management console may provide a view of unconfirmed/confirmed capacity related incidents showing corrective action data once corrective action has been confirmed. Initially, a problem or an incident may be assumed unconfirmed until research is performed during the root cause analysis of the incident. Features of the capacity management console may include automated data collection from a service center (e.g., from Peregrine Systems products or OpenView, both commercially available from HP). For example, data collection may be automated through the use of a keyword indicating the incident is assumed to be related to capacity. The console may also provide Web-based input forms for maintenance of the corrective action data/or and documentation of confirmation that the incident is capacity related. In one implementation, a dashboard including red, yellow and green indicators may display the status of incidents and status of corrective actions. Dashboard status may be described in a legend in the capacity management console.

An IT service continuity management console may provide a view of the disaster recovery testing status for specific applications. The IT service continuity management console may automate a previously manual method of data collection via Web-based input forms and security that limits users to maintenance of their own specific records. Features of the IT service continuity management console include Web-based input forms for automation of the data collection, indicators based on the status of the testing, and security that limits users to maintenance of their own specific records.

The portal may also be used by a contracting party to support service level agreements. The service level agreements may be contractually-based and measured by metrics. The metrics may be arranged so that users can find the data based on their viewpoint/role in the organization (e.g., by process, organizational structure, and/or service offerings). The data may be time sequenced to add meaning and/or context to the data to create organization information and knowledge. Metrics may also be added to a user's list for personalization/customization.

The portal may also include asset analytics. This may allow fire-drills of reconciling what is on the books versus what is really out in the environment to be avoided. An asset analytics console on a portal may also allow managing upgrades, checking status of virus protection, running of reports, spotting of trends, and/or comparisons among metrics. Asset analytics console may therefore allow intelligence.

Data for the analytics tool may be pulled into a data warehouse through multiple data inputs on a periodic or a continuous basis from various sources. The analytics tool, which may run on a service, may use the processed data from the data warehouse to provide intelligent reports for CIOs and other IT executives and managers. For example, analytics tools may allow executives or managers of a company to understand hardware and software deployments in their organization, including where they are located, if they are actually being used, and/or how they are being utilized. An asset analytics console may include pre-built reports or allow creation of custom reports to be created by a user or the company. The reports may be downloadable (e.g., to a spreadsheet or a PDF file).

The analytics tool may capture information about: hardware configurations (e.g., CPU, memory, storage, I/O and peripherals); software inventory (e.g., files and packages installed, versions and manufacturers for custom and packaged SW applications); associations between software license or services items and inventory (e.g., software license or service charge line items and their association to physical inventory (SW or HW)); resource utilization (e.g., hardware resource (e.g. storage) utilization on each machine with trending); and/or business/organizational aggregation (e.g., information aligned to the organizational structure (departments, locations, functions, groups and individual users)). An analytics console may allow reconciliation of financial and billing data discrepancies.

A non-limiting example of using analytics includes if a user is authorized to use IT data, the user may want an overall picture of the personal computer (PC)/server landscape in the environment. The user may access the analytics console and choose the PC and server inventory analysis report and execute it. The reports may provide the user with an overall picture of the environment. The user may be able to drill down to find the specifics (e.g., where PCs are located, what IO organization, and SSP number they belong to, etc.).

As another example, if a user is responsible for migration planning, the user may access the analytics console, select PC and server migration planning, select the operating system (e.g., Microsoft Windows 2000), select servers with a particular processor speed, select the memory (e.g., 256 MB), and/or select the disc space (1 GB). The user may then execute a report (e.g., showing how many machines do not have enough memory). Items listed in the report may be expanded (e.g., drilled down) to view more information.

In some implementations an analysis of virus compliance for a specific region may be generated in an anti-virus analytics view of a portal. A generated report may provide a graphical view of counts of regional (e.g., U.S.) assets with a number (e.g., ten) of the most recent version of the anti-virus files (e.g., McAfee DAT File) deployed on the assets and a summary line showing a percentage of total regional machines that have these most recent versions deployed. Another report may also be generated in the anti-virus analytics view to tell which specific patches had not been deployed to a particular server, and therefore are not being downloaded to the associated PC's. The reports may be downloadable (e.g., as a spreadsheet or a PDF file).

The Web portal may also include a service performance module, which allows event correlation and/or business impact visualization. This module may provide an at-a-glance dashboard assessment of service performance issues across different regions of the organization. The service performance console may correlate a world map view and current summary/currently affected applications (information changes based on region selected). The service performance console enterprise availability status, and/or integration/correlation of IT and business metrics. The map may allow for interaction between it and other consoles and views of the Web portlet. In addition, the map may allow for drill down capabilities.

The service performance console may provide focus on business improvement by allowing IT managers to see the business impact of infrastructure performance. The module may map metrics from a component level to a service offering to allow comprehensions of the true business impact of an infrastructure issue. For the module, events may be pulled from a virtual control center to a presentation application, such as Centauri commercially available from Proxima Technologies (Denver, Colo.) and displayed at the portal layer via Web services.

FIG. 1 illustrates one implementation of a system 100 for asset data collection, presentation, and management. As illustrated, system 100 allows a service provider (e.g., EDS) to provide asset data collection, presentation, and management to a client. In other implementations, a client may itself perform some or all of the service provider's functions.

System 100 includes a Web portal 110 and a Web portal 120. Web portal 110 includes a Web server 112, an application server 114, and a database server 116. Web server 112, application server 114, and database server 116 may be any appropriate types of servers. In particular implementations, Web server 112 is a Sun ONE/iPlanet 6.0, application server 114 is a BEA WebLogic Portal 8.1, and database server 116 is a Oracle 9 with OPS cluster. Web portal 110 also includes a storage area network device 118.

Web portal 120 may have components similar to those of Web portal 110. In particular implementations, Web portal 120 may be a mirror portal and/or a test portal.

System 100 may also have any of a variety of attributes. For example, system 100 may allow 24×7 global access through a simple web browser, personalization, customization, and search and content management capabilities.

In one mode of operation, Web portal 100 collects, presents, and manages data regarding the client's assets, which may be distributed around regionally, nationally, or globally. The asset data may be received in any appropriate format (e.g., word processing document, spreadsheet, and/or graphical presentation document). To provide for increased integration of the data, and hence, better analysis, at least some of the asset data may conform to uniform specification. Appropriate metrics for IT assets, for example, may include availability, service up-time, capacity, and bandwidth. Such metrics may, for example, be specified by a standard, such as the ITIL framework. Other appropriate metrics may also be used, such as those from contractual obligations of the service provider (e.g., service level agreements). Accordingly, asset data from across the organization may be brought together at one point in a meaningful way.

Web portal 110 may collect the data regarding the organization's various units by receiving it during uploads from the regions at any appropriate frequency (e.g., daily, weekly, or monthly). In some implementations, Web portal 100 may also poll the regions for the asset data. For example, Web portal 110 may poll appropriate servers in each region for the asset data.

Web portal 110 may also collect reports regarding assets. These reports may be retrieved or uploaded by users. In particular implementations, service provider employees that have responsibility for generating reports, possibly according to contractual requirements, may be able to post report to Web portal 100. The reports may be templated based on what the client desires to have reported back. The reports may be in any appropriate format (e.g., word processing, spreadsheet, presentation). The reports may also be link to each other and/or a data site.

Web portal 110 also categorizes and presents the asset data. The asset data may, for example, be organized around the service provider's service offerings. In particular implementations, the reports and metrics may be cross indexed into various categories—for example, as they relate to various process areas, client organizational units, service provider offerings, and the client organization units for operations, systems development and business management. The reports may have delivery cadences so that they are time sequenced. The sequencing may be observable in tables of reports that allow drilling down into a category.

Additionally, the presentation of the asset data may vary depending on viewer, region, and function. In particular implementations, the data may be categorized and presented in a multi-dimensional taxonomy. Furthermore, detailed technology implementations with drill down may be presented. The asset data may also be presented by geographic region, process area, and/or client's line of business. For example, the speed to answer a help desk in Europe may be associated with the European region, help desk operations, and/or the client's European operations. Process areas may include service desk, service level management, capacity management, change management, incident management, and/or problem management.

The asset data may be presented in summary view by process areas. For each process area, the asset data may be summarized of any appropriate time frame (e.g., a week, a month, or a year). Also, the summary view may have fields for asset data that is not currently being collected. Thus, users can be readily informed of the asset data to which they do not have access.

Asset data presented in one or more views by Web portal 100 may provide the ability to drill down to more underlying data. For example, when presented a monthly report, a user may want to examine the background data. By selecting the report, or a portion, the underlying data may then be presented to a user. As another example, when presented with a report regarding IT assets (e.g., based on age), a user may want to find detailed information on an asset. By selecting the IT asset, the user may be presented with detailed information regarding the IT asset.

When users of the service provider or the client wants to access Web portal 110, they may log into Web server 112. In system 100, Web server 112 uses a federated authenticated model to manage users from more than one organization. In this implementation, the service provider's users access Web server 112 through a virtual server 130 that belongs to the service provider, and the client's users access Web server 112 through a virtual server 140 that belongs to the client. The virtual servers are overlaid and aliased to two different Web sites. Web server 112 can then differentiate the users and authenticate them against their respective authentication services, service provider authentication service 150 and client authentication service 160. Thus, each authentication services may use whatever security protocols and data it desires. The service provider's users and the client's users may also be treated as associated with their respective organizations while using Web portal 110. A user may customize the information presented by Web portal 110, at start up or in reports. Reports may be in any appropriate format (e.g., XLF or PDF).

Web portal 110 may also implement access control techniques for the asset data. Thus, asset data may be associated with the service provide and/or the client. Furthermore, a particular user may be restricted from seeing certain types of data, possibly depending on the user's role in the organization.

Reports may be located by users based on their responsibility or area of interest. For example, service provider employees may see more reports as some of them are internal. Client employees, however, may see the reports that the service provider is contractually obligated to deliver to them (through the portal as the delivery mechanism).

In certain implementations, Web portal may present status (e.g., health) information for various assets. The status may, for example, be indicated by different colors (e.g., red, yellow, and green). Tools such as Centauri may be used to facilitate the presentation of the status. Users may also specify alerts (e.g., server failure) and status reports (e.g., all servers running) to be communicated, through an e-mail server 170 for example, to them. The alerts may be based on the status of the assets.

As part of the status information, the organizational impact service interruptions may be presented. These interruptions may be correlated with information from the service provider's backend systems (e.g., control center and/or configuration management database). This may map the various components of an application or service to the service level agreements that the service provider has in place and help to articulate not just that there is an outage somewhere in the environment, but that an outage is creating an organizational impact of a certain magnitude. In a manufacturing operation, for example, if a key paint application is down in one of the assembly plants and is backing up production by 100 units/hr., there is lost production because of this application outage. That may also impact the service provider's agreed upon service levels. Having this information, however, is an improvement because it shows the business impact of the service interruption wherever it is and showing it visually on the map.

In particular implementations, Web portal 110 may collect and present real-time data. The data may reflect changes in the remote site or at the portal.

Some implementations of Web portal 100 may include business analytics for assets. For example, data regarding the status of assets (e.g., expiring leases or software license compliance) may be compiled and analyzed. Such analytics may, for example, be provided by tools from Blazent of San Mateo, Calif.

System 100 may have a variety of features. For example, by having at least somewhat uniform asset data, various units within an organization may recognize the asset data they have and do not have. Thus, the overall data in the organization is enhanced. Additionally, the system may allow for production readiness checking, virus compliancy/vulnerability checking, and/or remediation tracking. As part of this, incidents may be reviewed and root-cause analysis may be performed through the Web portal. Furthermore, the system may allow up-to-date data to be pulled on a daily basis so that organization-wide business decision analysis and reporting on IT compute assets can be performed. The system may also provide an organization-wide view of the asset performance impact. The system may thus provide a fast, factual, and comprehensive view of hardware and software the client has across its organization as well as a view of multiple vendors. The system may also provide a service provider a clearer perspective of the client as the service provider may see data by region or organizational unit. Furthermore, the service provider may be able to search data by the services it provides for the client, such as applications development and management, business process outsourcing, or data center services.

System 100 may also the status of regional changes, virus compliance and vulnerabilities, and root-cause analysis for problem solving to be viewed. It may provide up-to-date information about global IT assets. Also, it may allow tracking and managing of events throughout the service management processes and lifecycles to see how IT events are resolved. This may improve both resolution speed and overall client service satisfaction.

In some implementations, system 100 puts enterprise and operations data in one rubric. Thus, processes may be aligned while transforming our service delivery, which may result in changes in organizational behavior. For example, service provider support staff and operational costs may be reduced while achieving a higher level of service excellence in delivering IT products and services the client.

The system may allow the service provider's support teams to manage the performance of the system to the client's requirements, eliminate differences and discrepancies in support, produce standardized work that is consistent, predictable, repeatable and measurable, work as one team with one direction in support of our client, and transform the way client IT business is operating.

In some implementations, the global visualization system may facilitate visualization and/or analysis of operations for different regions and/or organizational units of a company. Utilizing the web portal of the global visualization system may transform the way a company is run from reactive to proactive and preventative.

Information Technology ("IT") events may impact a company on a daily basis. The global visualization system may enable tracking IT events such as problems or failures in the system. The global visualization system may allow users to manage their business on a real time basis since they will have access to current and/or developing data. The global visualization system may enable a user to determine what is being done to remediate a problem. The global visualization system may improved speed to resolution and/or improved service for our companies. The global visualization system may standardize work, data on which analysis is based, and/or reduce differences in operating procedures in a company.

A user may access a global visualization system via one or more network protocols. FIGS. 2-27 illustrate various screenshots of an example of a Web portal coupled to a global visualization system. The global visualization system may require users to be authenticated (e.g., users may be required to log in to the global visualization system). The information displayed on the Web portal of a global visualization system may be at least partially based on the user and/or the user's role in the company. For example, Regional IT Managers of a company may only have access to regional information while a Regional General Manager may have access to global information. In one implementation, a Web portal of a global visualization system may direct a user to a global summary view upon entering the Web portal. A user may be able to customize which views and/or consoles are displayed upon entry of a Web portal of a global visualization system.

Figure 2:
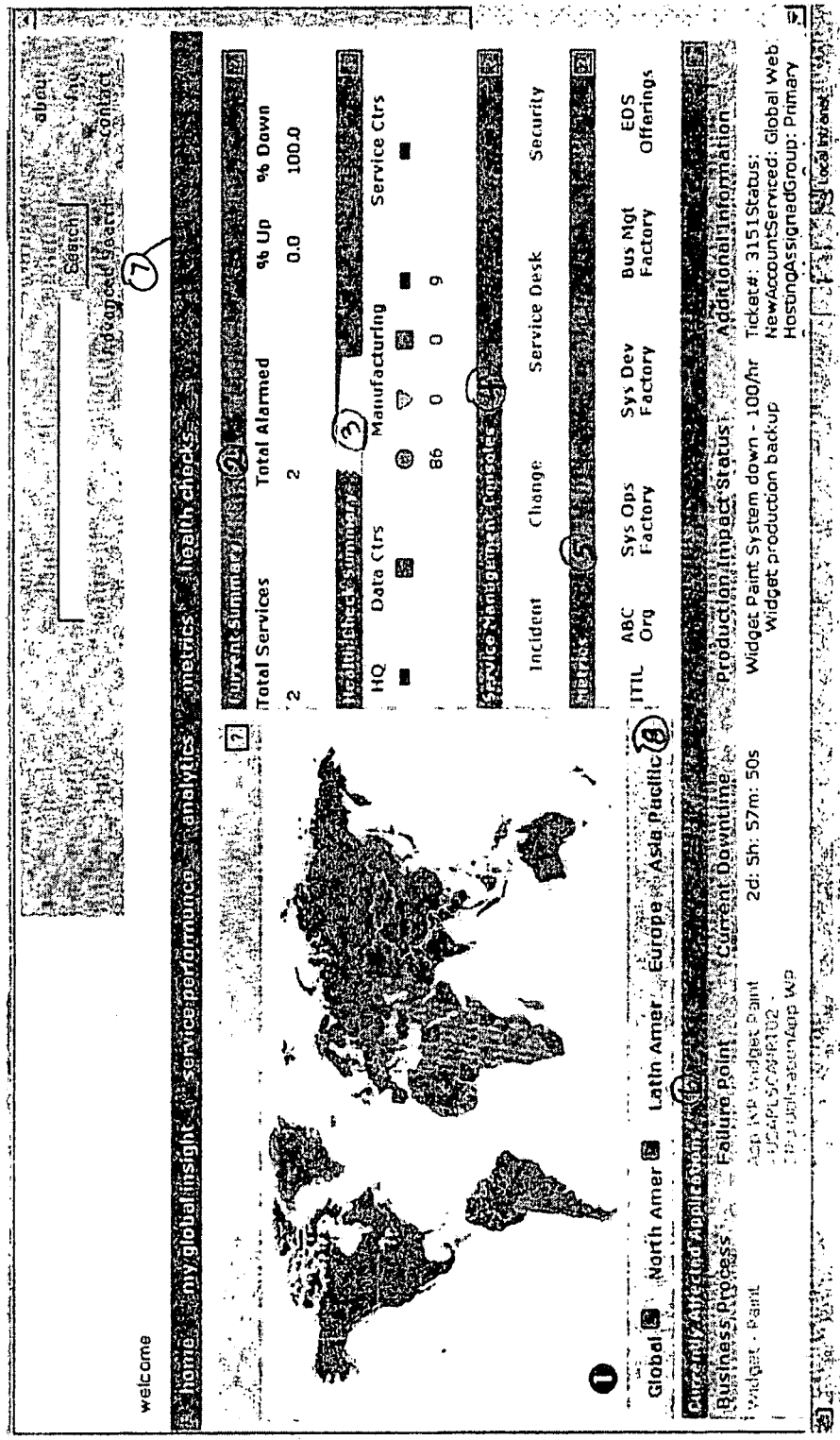
FIG. 2 illustrates a screenshot of an example of a global summary view of a global visualization system.

FIG. 2 illustrates a screenshot of an example of a global summary view of a Web portal of a global visualization system. A user may utilize the global summary view to visualize a company's operation from end-to-end using the global summary view. The global summary view may provide a business presentation layer for key global operations and enterprise information, which may allow teams to manage their business on a real-time basis by viewing various statistics (e.g., metrics, performance indicators) of how they are performing compared to other regions of the company, other organizational units of the company, predetermined standards and/or historical, company, industry, or governmental standards. The global summary view may provide an at-a-glance assessment of service performance issues. For example, alerts on the global summary page may call a user's attention to problems before calls come into a service desk and/or facilitate mitigation of problems before they have any critical business impact.

The global summary view may provide indications of issues that potentially impact or impact the business environment. A user may be able to review the global summary view and determine problems and/or the health of a company or companies. The global summary view may include fields such as, a map portion 1, a current summary portion 2, a health check summary 3, a service management console link portion 4, a metrics link portion 5, and/or a currently affected applications portion 6. The global summary view may also include links 7, such as on a toolbar, to other views and/or consoles of the global visualization system.

In one implementation, a global visualization system may include a link to a customizable view (e.g., "my global insight") of the global summary view and/or a regional summary view. A user may access the customizable view by selecting a link 7 on the toolbar depicted in FIG. 1. A user and/or a company may modify the customizable view to include specific views, consoles, status indicators, metrics, and/or analytics. A company may utilize a customizable view to facilitate management of assigned tasks, regions, and/or organizational units for a user.

A map portion 1 of a global summary view may be a graphical representation of the health or the condition of different regions of a company. The map portion 1 may map metrics from a component level to a service offering and/or facilitate user understanding of business impact of an infrastructure issue. The map portion 1 may include indicators at locations of problems or failures in the company. For example, as depicted in the map portion 1, a user can determine the health or the performance of a company on a global scale by viewing the map portion. The map portion 1 may facilitate business improvement by allowing IT managers to see the impact of infrastructure performance.

As depicted in FIG. 2, the global summary view may include a current summary portion 2. The current summary portion 2 may be customized by a user and/or by a company for a user. The current summary portion 2 may include a summary of predetermined types of problems. Additional information about the problems identified in the current summary portion 2 may be viewed in the currently affected applications portion 6 of the global summary view. For example, the currently affected applications portion 6 may include details such as which business processes the problem is in, what failed, downtime, the impact on production or other tasks, and/or other information such as a problem ticket number. A user may select the problem in the currently affected applications portion 6 to view additional details about the problem. The currently affected applications portion 6 may allow a user to view the correlation between IT and business metrics and/or facilitate decision making based on the displayed data.

The global summary view, current summary 2, and/or currently affected applications portion 6 may be coupled such that as a user selects a region on the map portion 1, the data displayed in one or more of the other fields changes. In one implementation, the regional summary view may be displayed when a user selects a region of the map portion 1 on the global summary view. In another implementation, a user may select whether to view regional information in the global view and/or the regional summary view.

Figure 3:
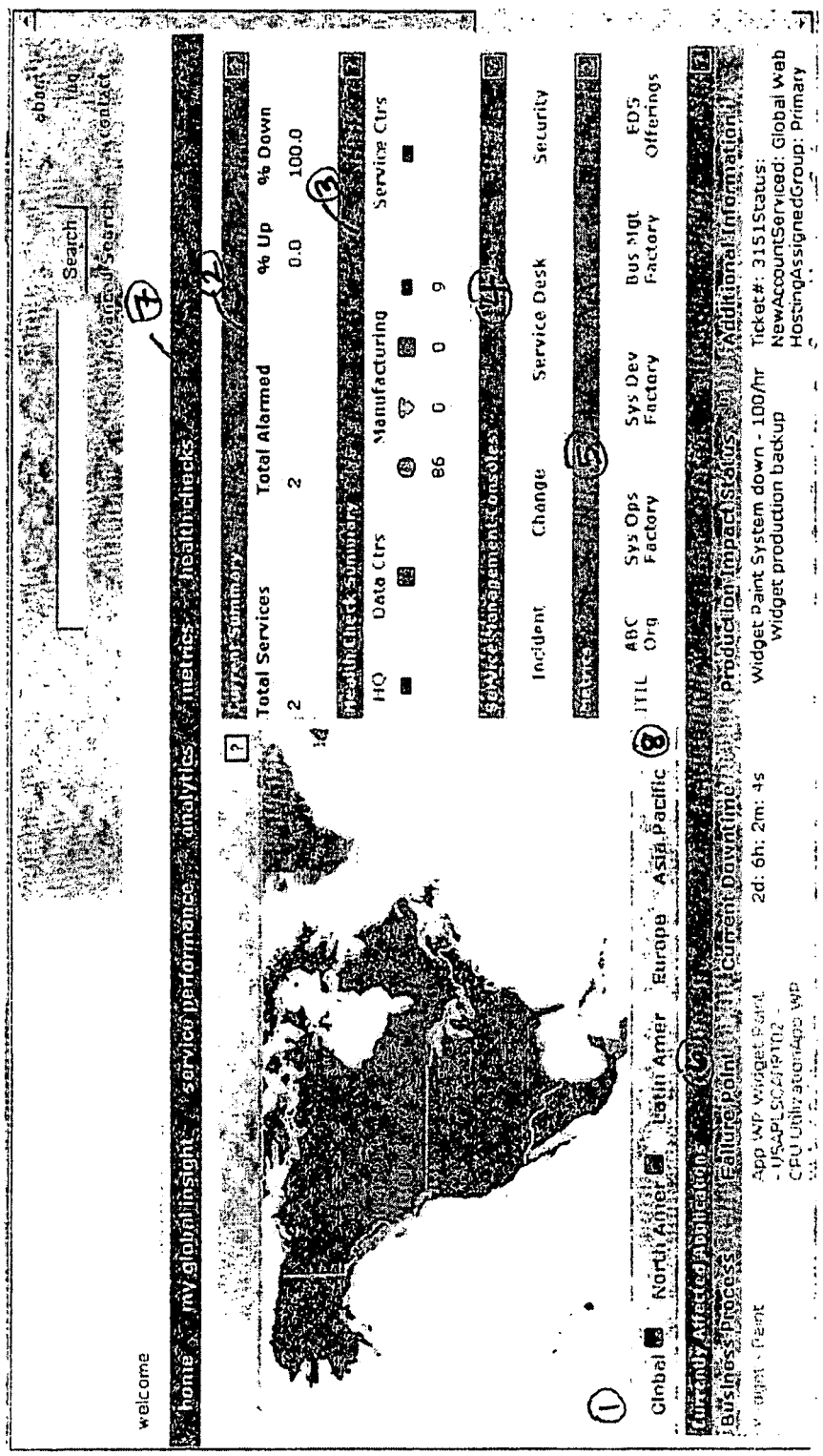
FIG. 3 illustrates a screenshot of an example of a regional summary view of a global visualization system.

FIG. 3 depicts a screenshot of an example of a regional summary view. In one implementation, a regional summary view may be displayed when a user selects a region, such as North America, in the global summary view of FIG. 2. A user may select a region of the map portion 1 of the Web portal and/or a link 8 to access a region summary view. In one implementation, the map portion 1 of FIG. 3 displays only the selected region.

The regional summary view may depict similar fields to the global summary view. The global summary view and/or the regional summary view may allow a user to select a link on one of the fields or portions of the view and display additional details about the selected link. The fields in the regional summary view may be based on regional data, as opposed to the global data displayed in the global summary view. For example, the current summary may be based on problems in the region currently displayed in the global visualization system. In one implementation, a global visualization system may include regional analysis tools such as Centauri, commercially available from Proxima Technology (Denver, Colo.), coupled to the map portion 1 and/or links 8 to provide regional data.

FIGS. 2 and 3 illustrate a view of the global visualization system reporting that an outbreak has impacted the company. The global summary view and regional summary view illustrate that the problem has impacted specific servers in the North America region, web hosting, widget painting application, and the widget catalog application server. The map portion 1 displays indications of a problem (e.g., using color, shading, and/or flags on a map portion to mark incident spots). The current summary portion 2 indicates that two alarms have occurred and that 100% of the system is down or off-line. Status indicators proximate links 8 indicate the location of a problem (North America). The currently affected applications portion 6 indicates that the problem is causing a backup at a rate of 100/hr (e.g., not being able to paint widgets will back up production). The currently affected applications portion 6 also indicates that the catalog has been impacted. An impaired catalog may result in lost revenue to the company since retailers can not place orders. The currently affected applications portion 6 may include details about the problems, such as the extent of the problem (e.g., all dealers have been impacted); origin time of the problem (e.g., the problem began at 5:30 am); affect on various organizational units of the business such as production (e.g., an estimated 5000 orders may be unable to be completed at this time); and/or at what capacity the company is operating (e.g., the 20% of normal capacity based on orders received by fax rather than an online catalog). By viewing the global summary view and/or the regional summary view a user may be able to quickly process the information available and/or the decision making process regarding the problem or failure may be facilitated.

Figure 4:
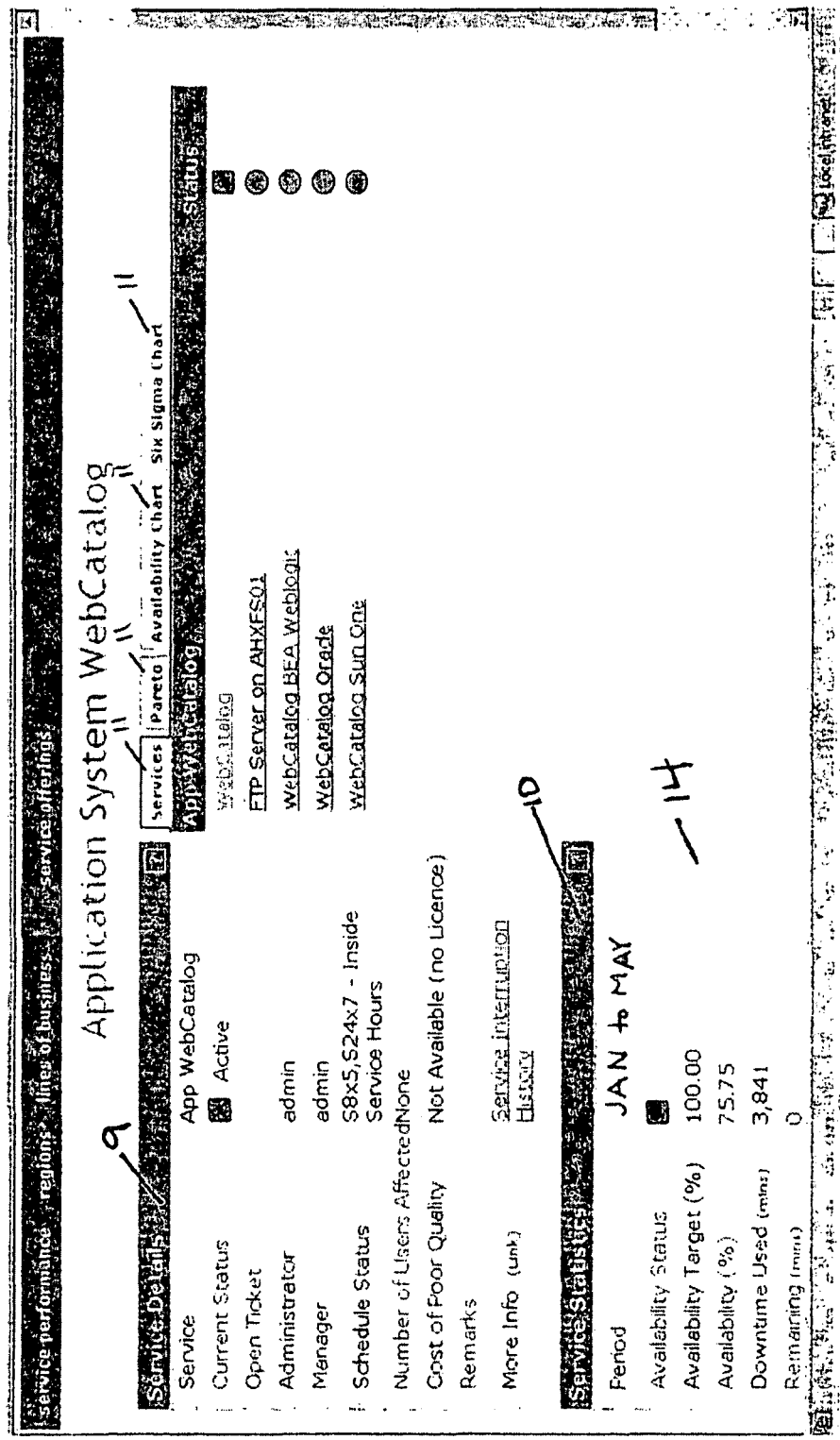
FIG. 4 illustrates a screenshot of an example of a service detail view of a global visualization system.
Figure 5:
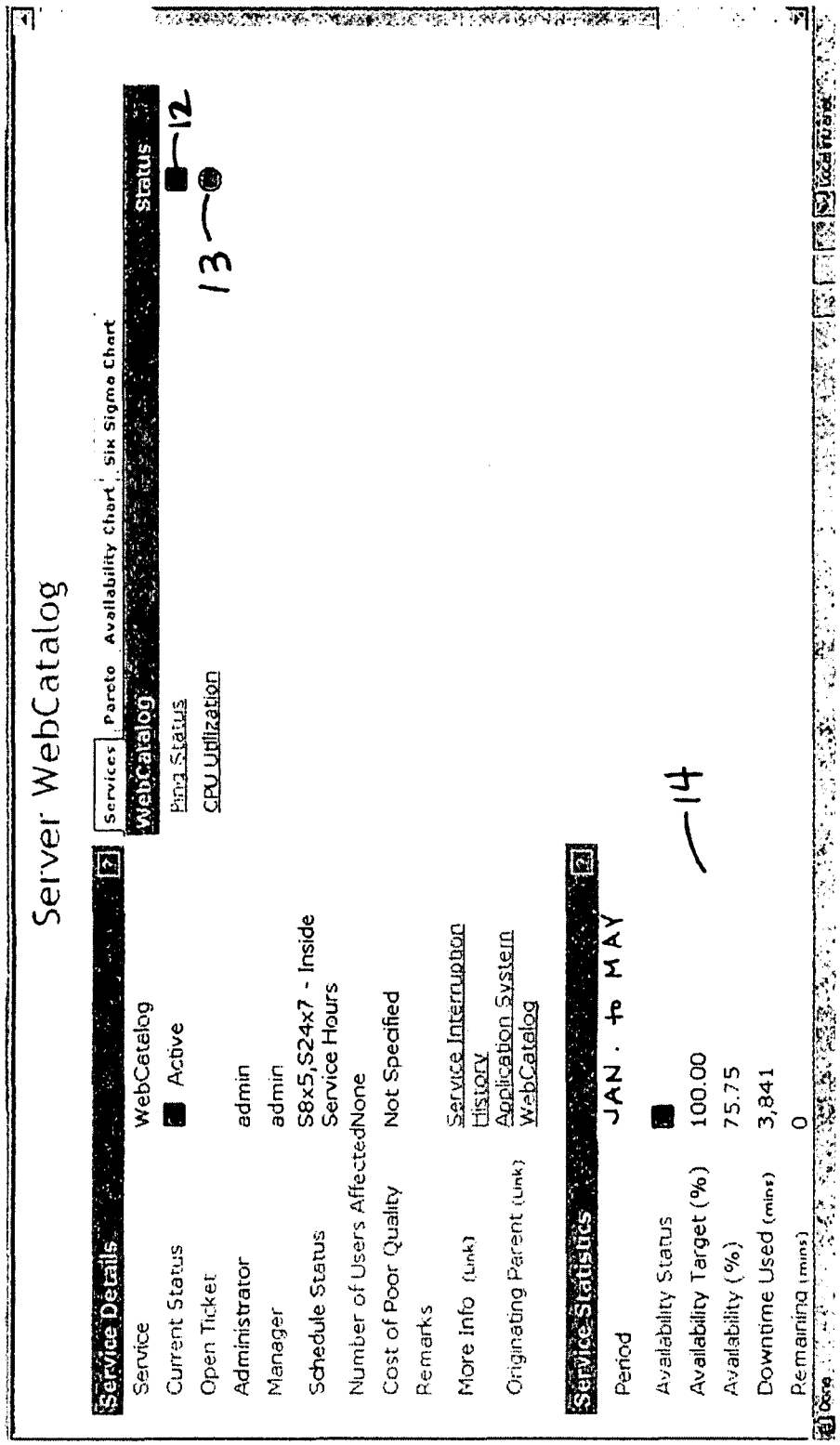
FIG. 5 illustrates another screenshot of the service detail view of FIG. 4.

A user may access a service detail view to view and/or analyze details about problems in the company (e.g., selecting open ticket displays details about the open ticket). FIG. 4 illustrates an example of a service detail view. In one implementation, if a user selects a specific problem displayed in a global summary view and/or regional summary view, a user may access a service detail view. The service detail view may include a service details portion 9 and/or service statistics portion 10. The service details portion 9 may indicate a status for the selected failure (e.g., active, inactive, impaired, and/or functional). As illustrated in FIG. 4, the service details portion 9 indicates the WebCatalog is impaired. When the WebCatalog is impaired, the server may not be pingable and/or CPU utilization may exceed a predetermined amount. FIG. 5 illustrates an example of a screenshot of the details of the WebCatalog impairment. A user may access details by selecting a component, such as the WebCatalog in FIG. 4. The status of various indicators of performance such as pinging and CPU utilization may be observed. The system depicted in FIG. 5 includes an indicator 12 that identifies that the WebCatalog is not responding to pings and an indicator 13 that the CPU utilization is within a predetermined range and thus functional.

The service statistics portion 10 on the service detail view may include statistics regarding service for a period. The service statistics portion 10 may facilitate identification of downtime and/or failure to meet goals or targets. For example, the service statistics portion 10 may provide notice 14 when goals are not met for services. The service detail view may include selectable pages 11 that provide information on services, pareto, availability, and/or IT business analytical tools such as Six Sigma Charts (e.g., based on Six Sigma Quality Improvement tools). The services selectable page 11 may include data relating to, but not limited to, components of the problem area (e.g., components of an application that is failing), the status of each component, and/or open tickets relevant to the failure point selected. Charting capabilities in the service detail screen may be utilized to facilitate understanding problem areas, availability, and/or whether processes are in control.

Figure 6:
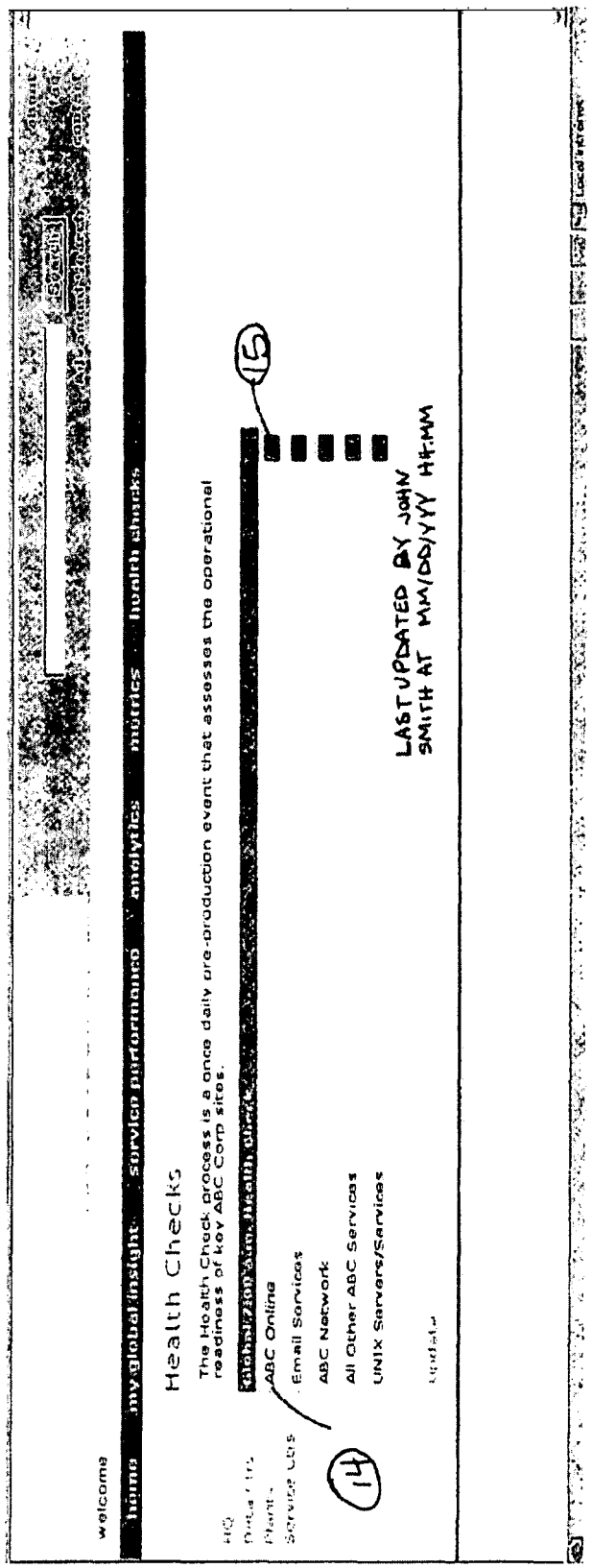
FIG. 6 illustrates a screenshot of an example of a health check view of a global visualization system.

A global visualization system may include a health check view to provide a summary of the health of various organizational units and/or regions of a company. FIG. 6 illustrates an example of a screenshot of a health check view. The health check view may be accessed through links 3 and 7 on the global summary view and/or regional summary view.

The health check view may display data based on a selected organizational unit and/or region of the company (e.g., headquarters, data centers, or plants). For example, a user may select to view data by plant to determine the health of a specific plant (e.g., determine if a plant is ready to produce product). The health check view may include daily operational production readiness assessments in various organizational units and/or regions of the company or key production environments. Key production environments may be customizable by the user and/or company so that a user may be presented a simplified view of the health of various components. In one implementation, key production environments may include the environments that a user is responsible for (e.g., a user may only view environments for which the user monitors). The health check view may be utilized to determine and/or concur that issues are impacting several services and applications that are key to a company. In one implementation, a user may access the health check view at the start of a business day when a production readiness assessment may be conducted. Additional details of the health of the various key production environments may be presented when a user selects a key production environment 14 or a status indicator 15.

Figure 7:
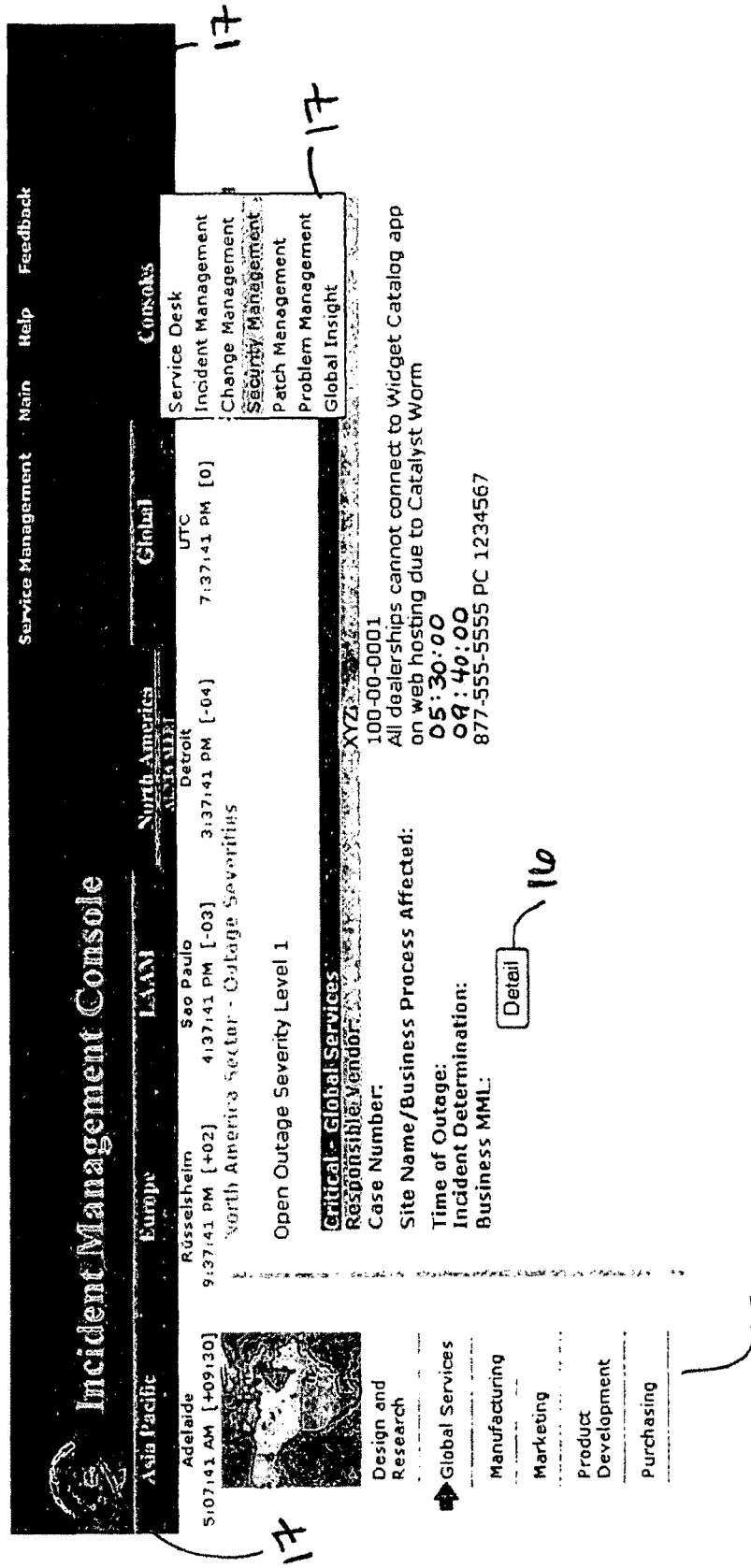
FIG. 7 illustrates a screenshot of an example of an incident management console of a global visualization system.

FIG. 7 illustrates an example of an incident management console. Consoles (e.g., incident management console, change management console, security management console, etc.) may include links 17. Various views and consoles may be accessed through links 17 in the incident management console. For example, a user may view the incident management console by various regions of the company, and/or by various organizational units such as marketing, manufacturing and/or purchasing. A user may access various consoles using links on the incident management console.

In one implementation, an incident management console may be accessed through links 4 on a global summary view and/or a regional summary view. The incident management console may allow monitoring in real-time and/or monitoring of more than one vendor. The incident management console may provide structured and/or predictable methods for responding to disruptions in different regions and/or organizational units of a company (e.g., key production environments). The incident management console may interface with local support procedures, may define a consistent method for engaging support teams, and/or may provide notifications of severity level one disruptions. As shown in the example of a system in FIG. 7, a problem began at 5.30 a.m. when an outbreak of a Catalyst worm impacted a company. A security level of the problem may be included on the incident management console.

Further details of a problem displayed in the incident management console may be viewed by selecting a detail link 16. Details of a problem or incident may show detailed information such as conversations between production environment managers and service desk team members as calls are received regarding the problem. In one implementation, a service desk may identify the issue as an incident or problem and/or generate an incident record which populates the incident management console. For example, in the system of FIG. 7, additional information about the various critical issues may be displayed in the detailed view, such as incident identification time, case number or case ticket number, status of the incident and/or task associated with the incident, sites or production regions impacted within the company, and/or details of the incident.

Figure 8:
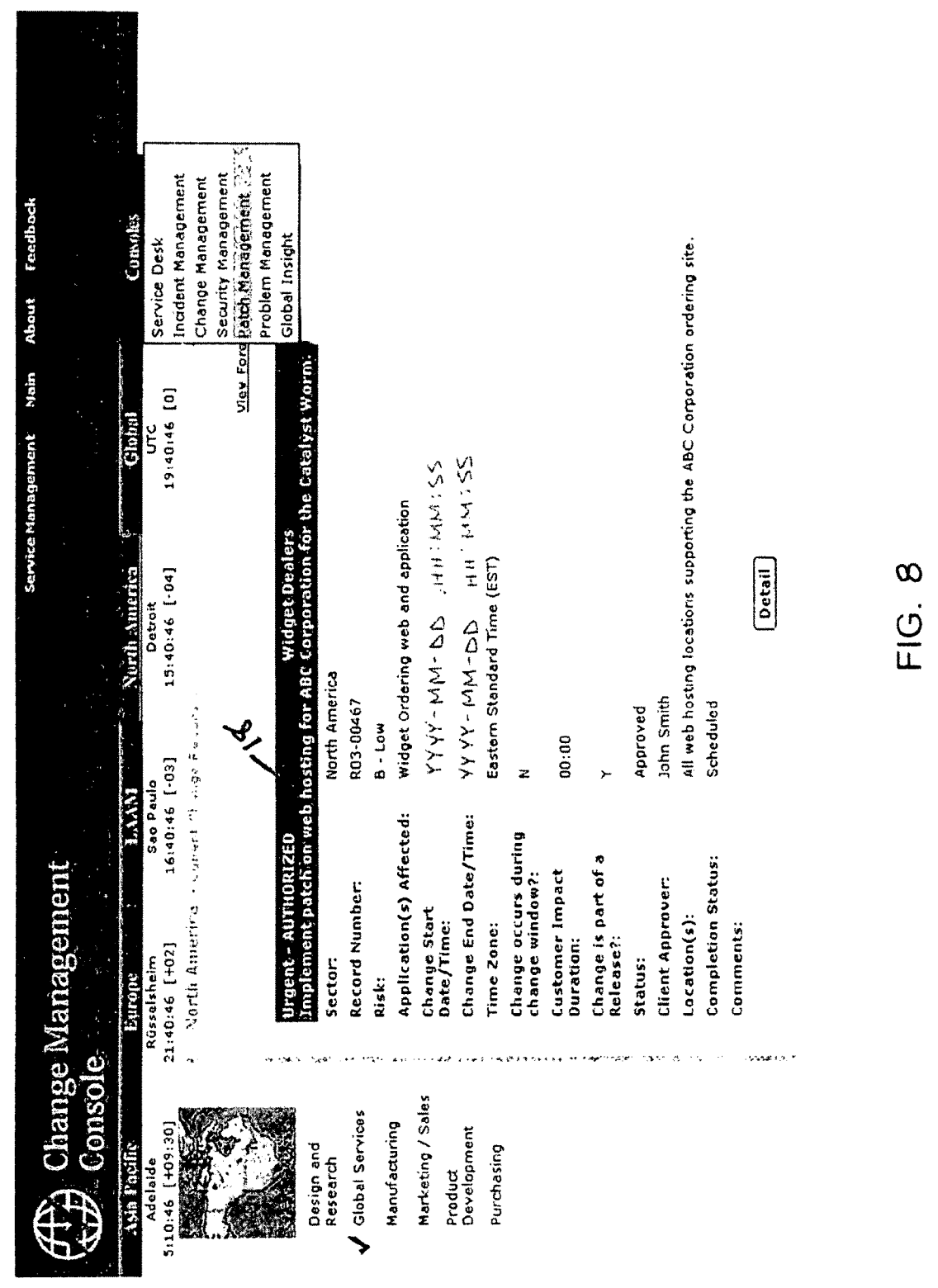

FIG. 8 illustrates an example of a change management console. A change management console may be accessed through links on other consoles (e.g., link 17 on the incident management console of FIG. 7) and/or links 4 on a global summary view and/or a regional summary view. A change management console may provide structured and/or predictable methods for responding to critical change controls which have been identified across global operations. The interface of the change management console may include a portion that includes business processes or units for a selected region, such as Design and Research, Global Services, Manufacturing, Marketing, Sales, Product Development, and Purchasing. As illustrated in FIG. 8, the Global Services business unit has been selected and the asset data presented in the change management console is related to the selected business unit.

The change management console may include an emergency change portion 18. The emergency change portion 18 illustrated in FIG. 8 indicates that a patch is ready to be released. The emergency change portion may be expanded so that details of the change may be shown (shown in FIG. 8) or contracted so that only a header and/or a summary is shown in the change management console (not shown).

Figure 9:
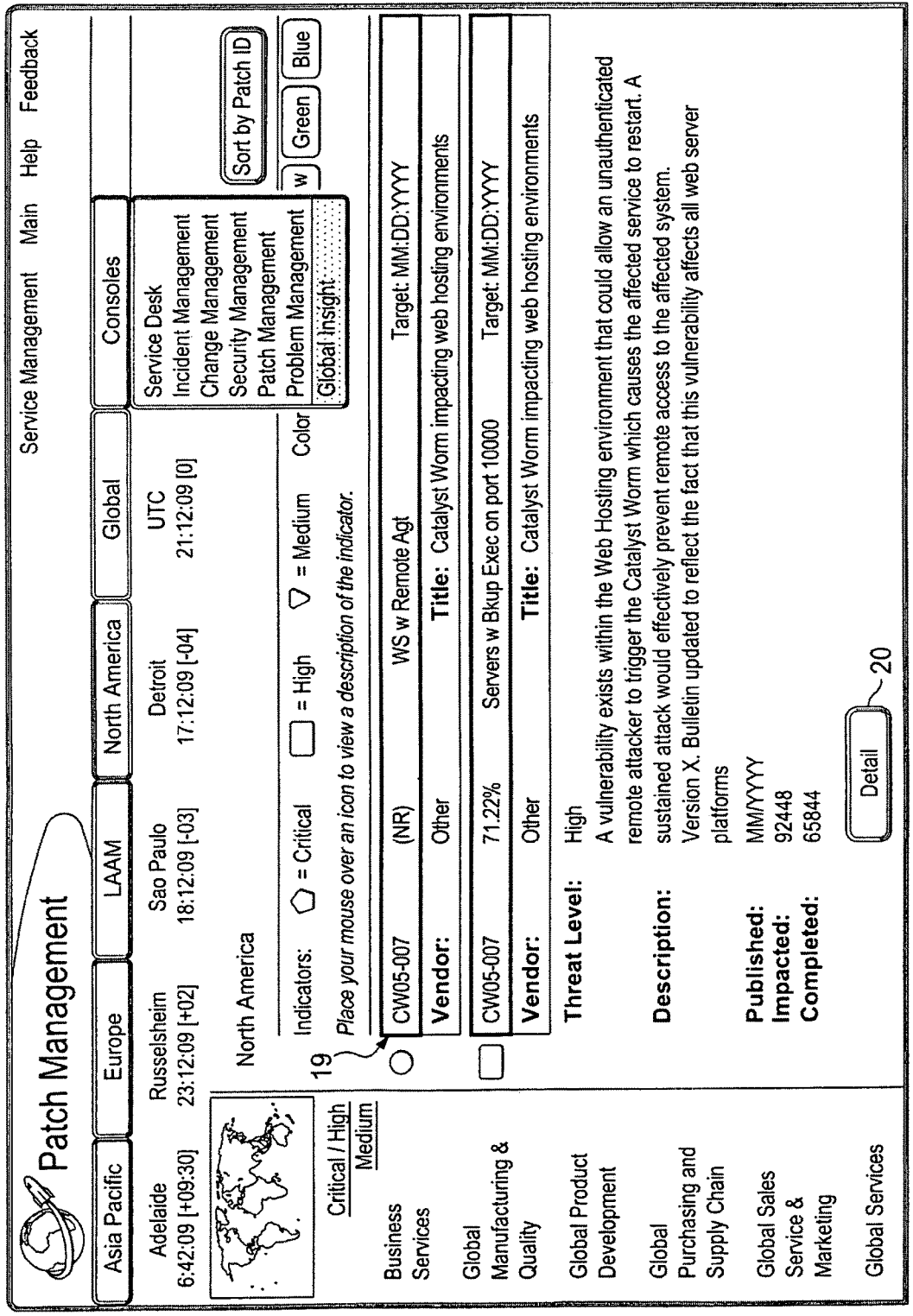
FIG. 9 illustrates a screenshot of an example of a patch management view of a global visualization system.

A user may access a patch management console in response to identified problems and/or to monitor the progress of implementation of patches. FIG. 9 illustrates an example of a patch management console. In one implementation, a patch management console may be accessed through links on other consoles (e.g., link 17 on the incident management console of FIG. 7). A patch management console may facilitate implementation of patches for problems (e.g., virus definition updates or software patches) A patch management console may provide a structured method for reporting the status of patching activity globally. The patch management console may interface with local support procedures to ensure a consistent method for data collection and/or timely reporting of patching results. The patch management console may provide a summary (e.g., an executive overview) for patching activities occurring on the company's infrastructure.

The patch management console may include fields 19 for each patching event. Patching events displayed on the patch management console may be expanded to display details related to the patching activity. In the system depicted in FIG. 9, the details for the patch for "Servers w Bkup Exec on port 10000" is shown to be 71.22% complete through the company. A user may select a details link 20 on the patch management console to view additional details related to the patching activity.

Figure 11:
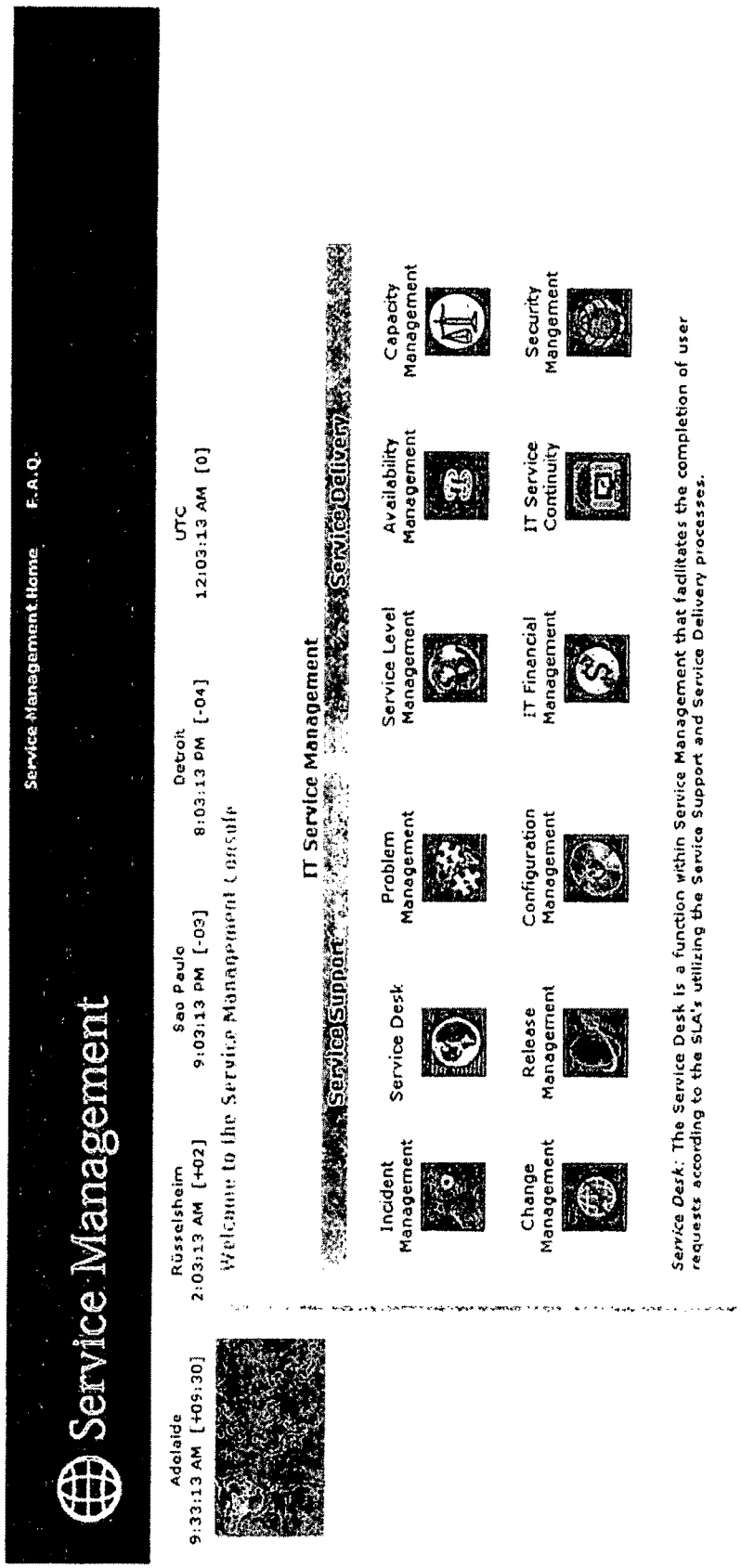
FIG. 11 illustrates a screenshot of an example of a service management console of a global visualization system.

FIG. 10 illustrates a patch detail view of the "Servers w Bkup Exec on port 10000" patching activity illustrated in FIG. 9. The screenshot of FIG. 10 may be a pop up window. The patch detail view may display regions of the company and/or top level organizations. A user may select regions or top level organizations to view successively lower levels of detail where comments can be entered regarding the status of the patch. A company may track the status of internal and/or supplier patching. Colors may be used as indicators. For example, groups that are completely patched (100% implementation across the company) may be shown with green. Groups which are still under 100% may be shown with red. Expanding a patching activity may display more detailed information, such as of what locations or servers have not yet been patched FIG. 11 illustrates an example of a service management console of an example Web portal of a global visualization system. The service management console may allow access to various service functions such as service support and/or service delivery. Links to the various service management consoles, such as service desk, incident management, problem management, configuration management, change management, security management, release management, capacity management, availability management, service level management, IT financial management, and/or IT service continuity, may be presented on the interface. The various service management consoles may retrieve, analyze, and/or present asset data related to the service management console according to industry and/or business guidelines, such as the ITIL framework or ICTIM processes. For example, a user may access a service desk view through the service management console and/or through links 4 in a global summary view and/or a regional summary view.

Figure 12:
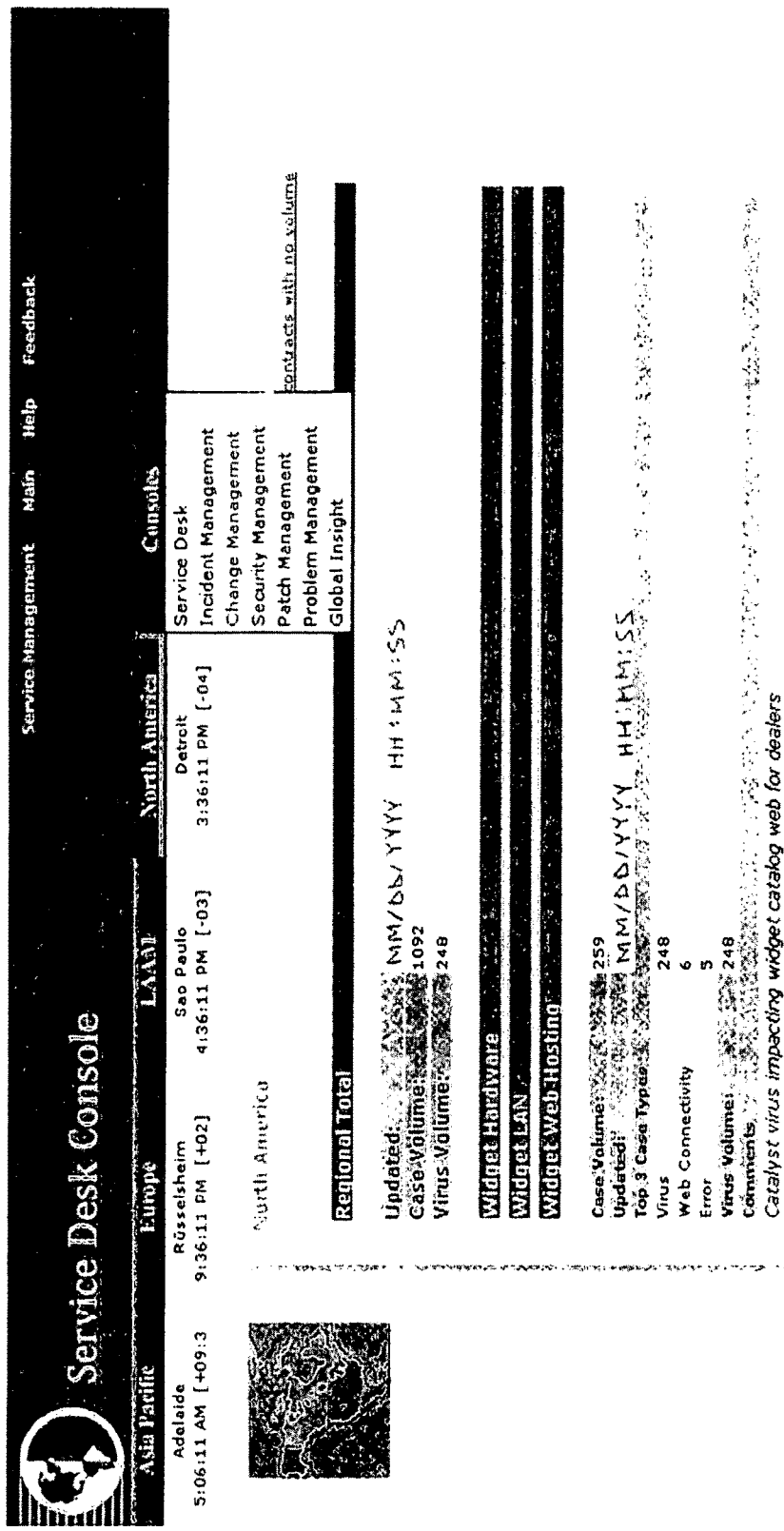
FIG. 12 illustrates a screenshot of an example of a service desk console view of a global visualization system.

FIG. 12 illustrates an example of a service desk console. A service desk view may facilitate service management by providing a central repository for Global Service Desk data collection and/or retention in order to consolidate global data into a consistent format and/or display global data in a consistent view.

The service desk console may consolidate global data into a consistent format; provide dashboard view of global data; and/or increase understanding of a company's current IT environment. The service desk view may provide a real time view into service desk requests across the globe. The service desk view may gather and/or report data to provide necessary information for users. The service desk console may allow a user to view information about various components of a company, such as a widget's Web Hosting. A user may notice a high volume for Web hosting due to an indicator (such as color) used by the service desk console to identify problems. The user may select Web hosting to expand the record and/or view details associated with the record. The user may analyze the contents of the record.

Figure 13:
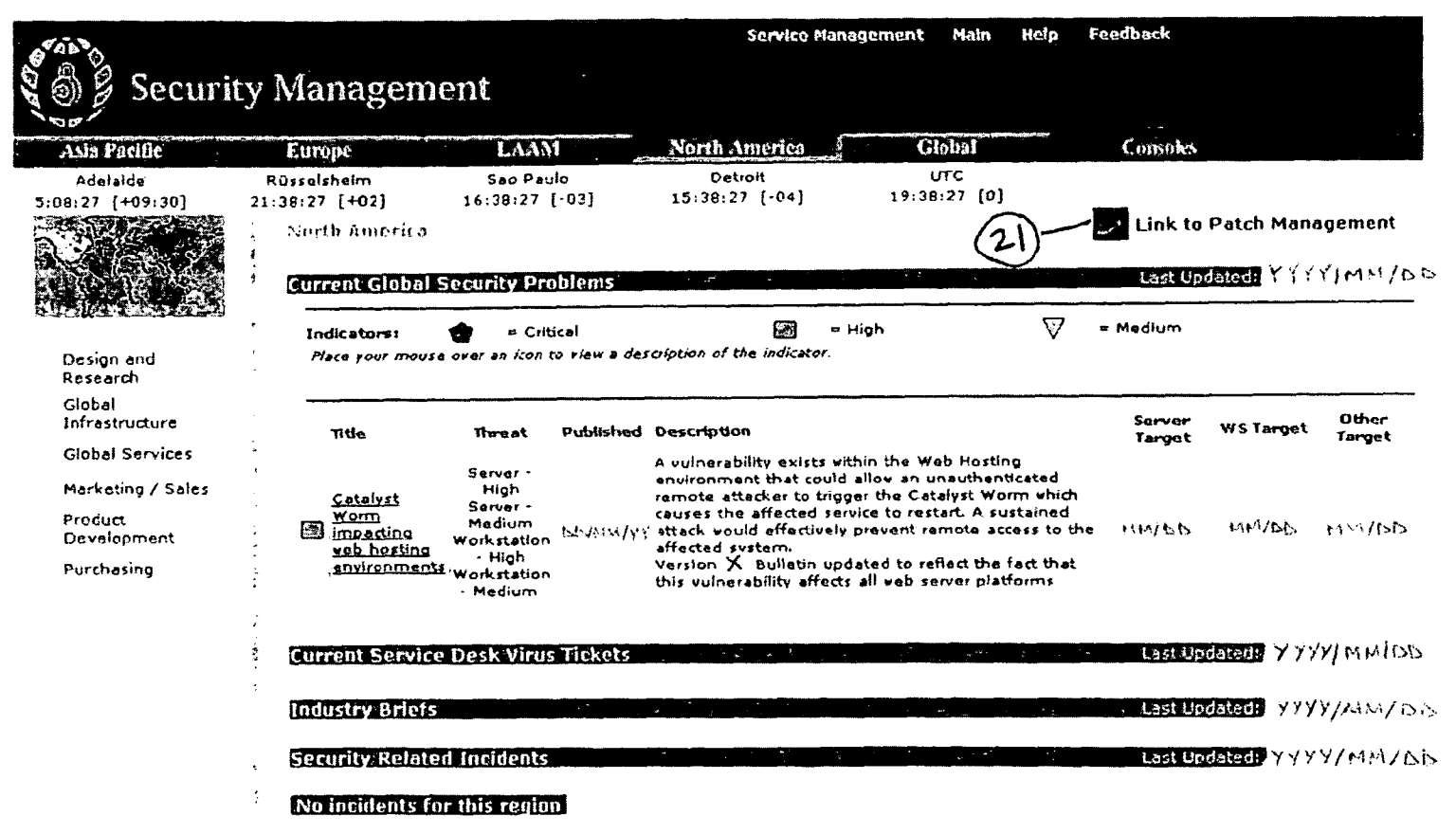

A user may utilize the global visualization system to monitor security aspects of the company. FIG. 13 illustrates an example of a security management console. The security management console may display real-time state of security of the company. In one implementation, the security management console may be accessed by selecting the title of a problem in a service desk console (e.g., "catalyst worm impacting web hosting" in FIG. 12). The security management console may be accessed through links on other consoles (e.g., link 17 on the incident management console of FIG. 7) and/or links 4 on a global summary view and/or a regional summary view. The security management console may deliver information to members of a company such as global security operational stakeholders, who may then act on the information to manage the level of security risk. This information and/or the way it is presented may supplement security-related information available on other consoles and portals.

Security-related incidents may be listed for each applicable region or globally, depending upon the type and the scope of the incident on the security management console. In one implementation, incidents that appear in the security management console are those that did not meet general global incident or problems thresholds, but did meet thresholds for global security reporting. The security management console may indicate if there are any incidents for the region. The security management console may include fields such as a listing of current global security problems, patch target dates, threat level indicators, current service desk virus tickets, industry briefs, and/or security related incidents. Each field may be expanded to display additional details regarding problems in each field. The company depicted in FIG. 13 has a catalyst worm problem. The details regarding the identified problem including a description of the virus and/or the threat level assigned to the problem by the company's security team may be displayed when the catalyst worm problem field is expanded.

The security management console may also include information regarding whether patching target dates have been identified. The security management console may include a link 21 to the patching management console 20. Utilizing links on a page to related pages may facilitate use of the global visualization system by the user and thus allow a user to quickly obtain needed information and/or make decisions based on the needed information.

Figure 14:
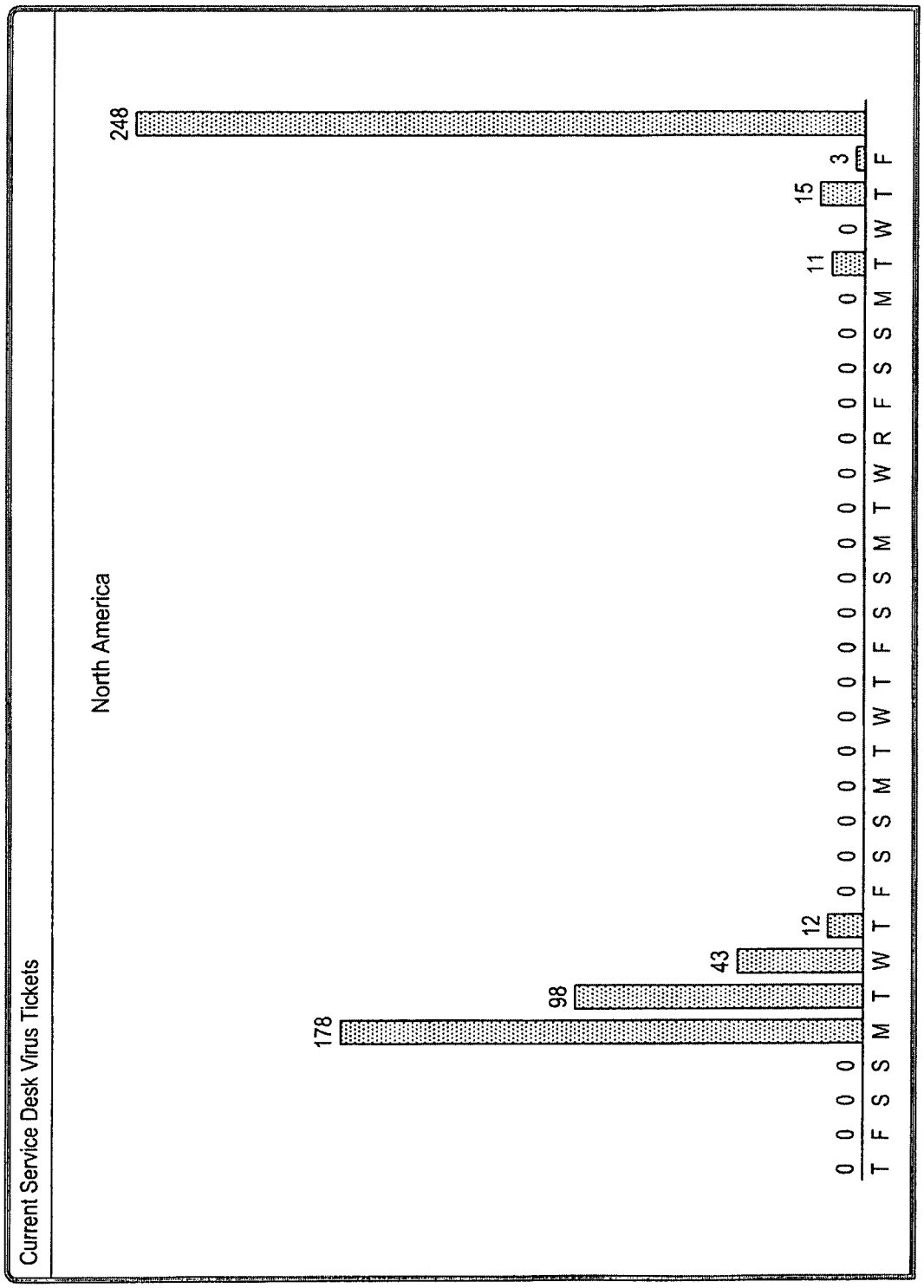
FIG. 14 illustrates a screenshot of an example of a detailed service desk virus tickets view of a global visualization system.

A user may utilize the global visualization system to access specially monitored items by the company such as virus tickets or problem submissions regarding viruses submitted to the service desk of the company. FIG. 14 illustrates an example of a detailed view of the service desk virus tickets field of FIG. 13. The detailed view of desk virus tickets may be displayed for regions of the company and/or globally. Current Global Security Problems may be displayed on the global tab. In one implementation, when security threats and vulnerabilities reach threshold of Medium or Higher, global direction is provided to apply workarounds or corrective actions. The threats and vulnerabilities may be listed is on the service desk console.

Current service desk virus tickets may be displayed for each region and/or for the entire company on a global tab. The detailed view of the desk virus tickets may be coupled to the service desk console. The desk virus ticket field may be a compilation of service desk virus tickets fed from the Service Desk Console. A graphical representation of virus tickets may facilitate identification of problems and/or analysis of the information displayed.

Figure 15:
FIG. 15 illustrates a screenshot of another example of a security management console of a global visualization system.

FIG. 15 illustrates an example of a view of the security management console with the industry briefs field expanded. A security industry brief field may provide an overall view of the general threat a company is under and/or a summary of a company's specific vulnerabilities. The patch management console may be selected to address specific problems identified on the security management console. The change management console may be selected to view the changes resulting from the implementation of the patches for the problem identified.

Figure 16:
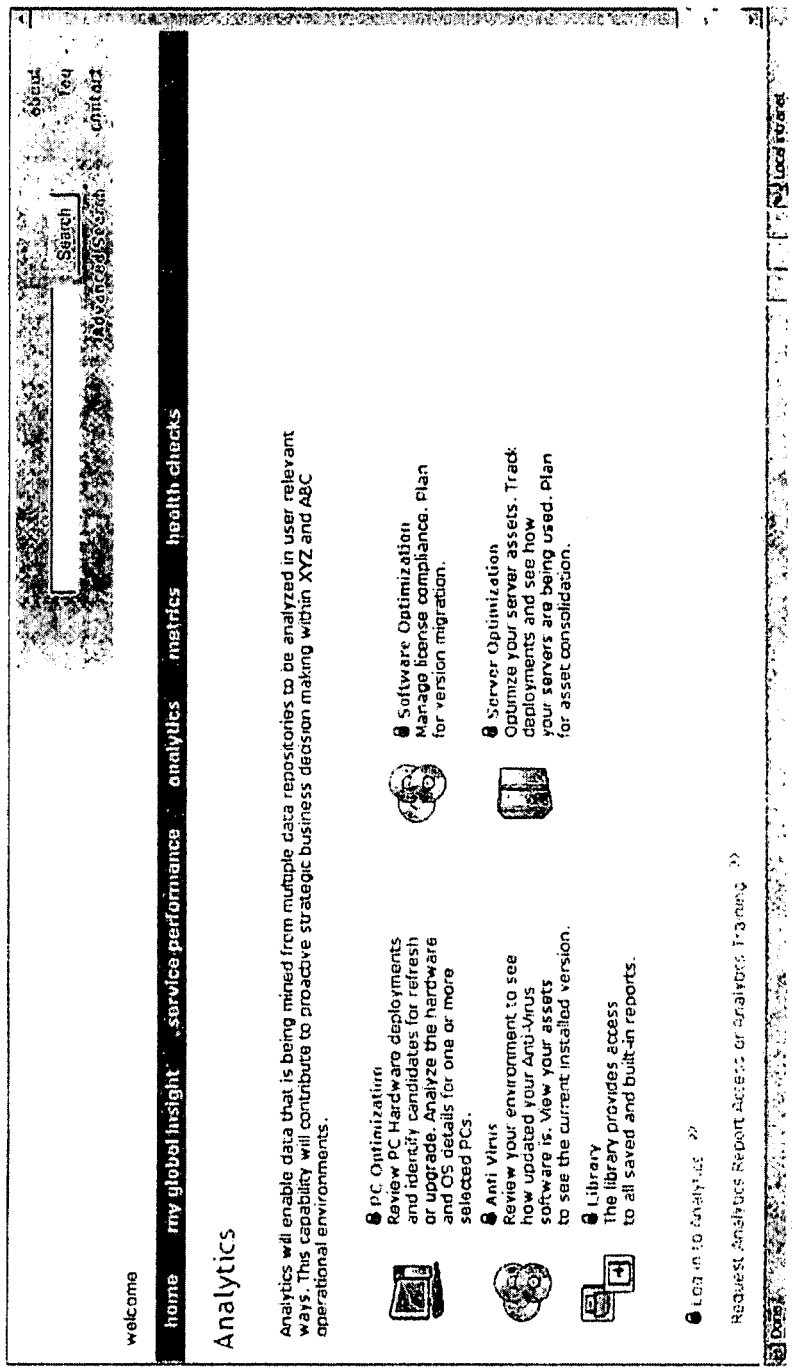
FIG. 16 illustrates a screenshot of an example of a analytics view of a global visualization system.
Figure 17:
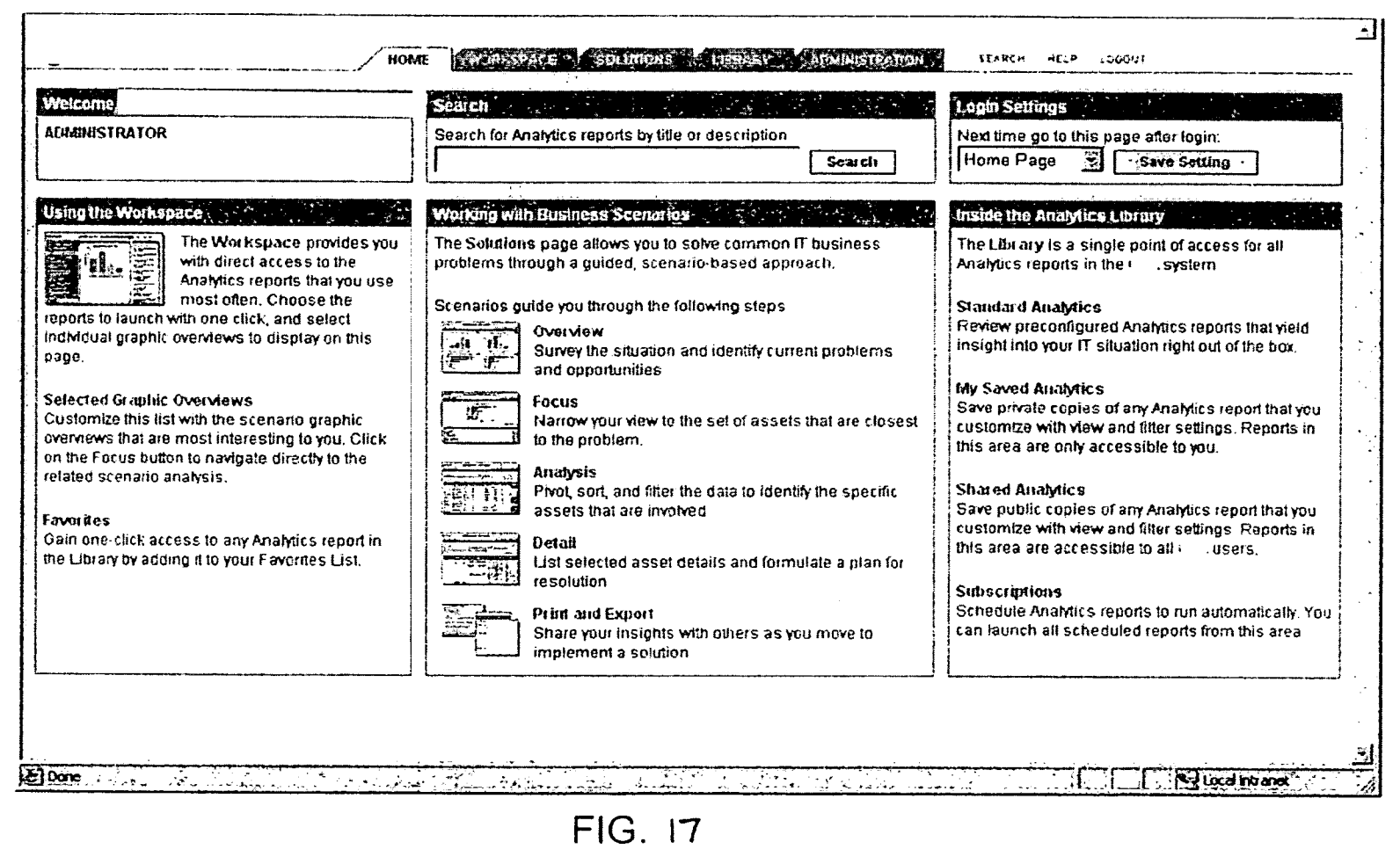

Users may access various analytical tools for the company or organizational unit and/or regions of the company using the global visualization system. FIG. 16 illustrates an example of an analytics view of an example of a graphical representation of the global visualization system. FIG. 17 depicts another view of an analytics view. An analytics view may allow a user to avoid the need for reconciliation of information in company records with reality, manage upgrades, check status of virus protection, run reports, see trends, and/or make comparisons. The analytics view may increase asset intelligence for a company. Asset analytics may be utilized to ensure that anti-virus compliancy, software-licensing compliance, facilitate financial and billing reconciliation. In one implementation, the global visualization system may include analytics and/or metrics commercially available from Blazent, Inc. (San Mateo, Calif.).

The analytics view may provide data related to, for example, PC optimization, anti-virus (e.g., percent compliance for applying a patch across an environment or region of the company), software optimization, and/or server optimization. The analytics view may also include a library that provides access to reports.

Figure 18:
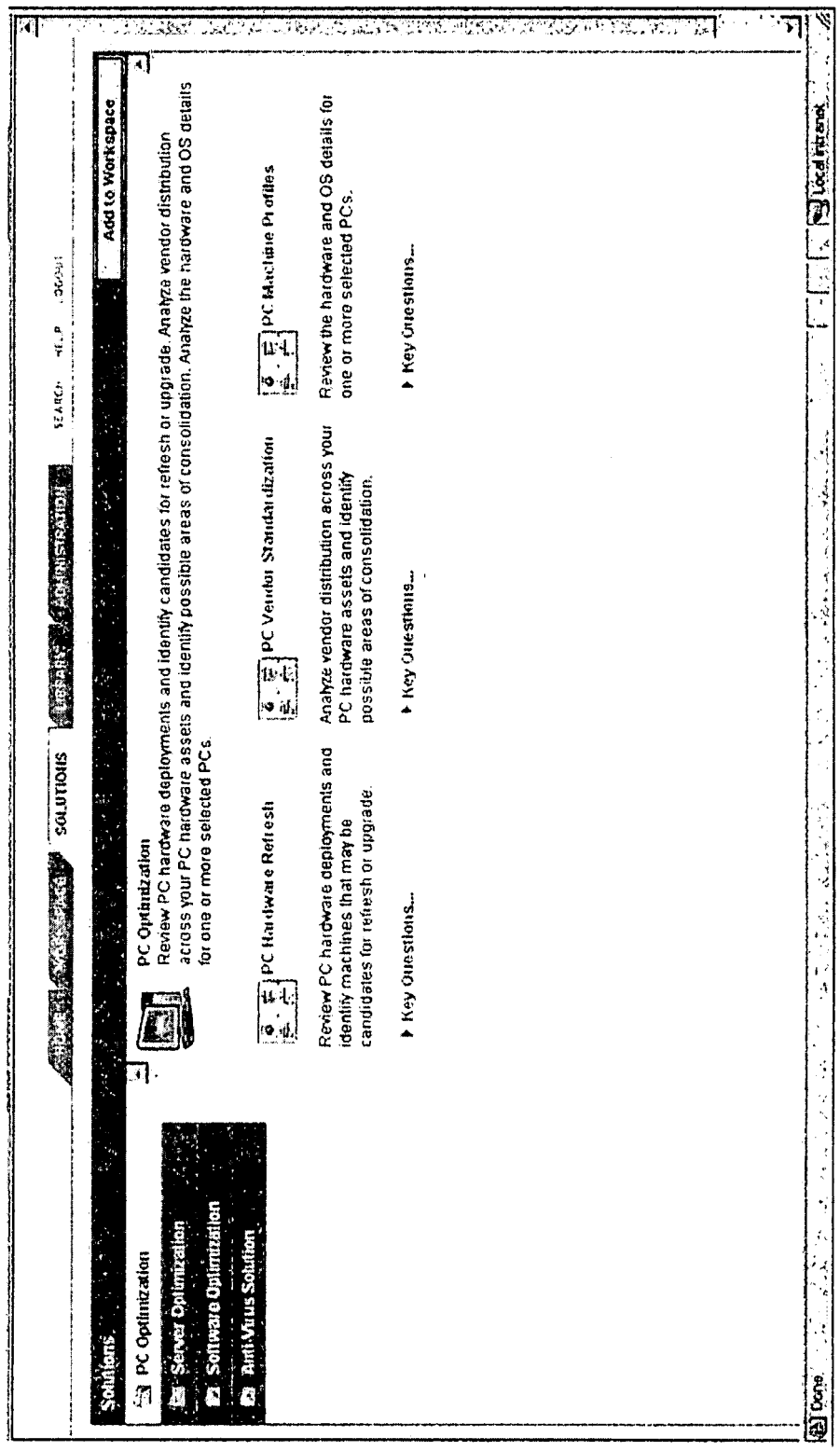
FIG. 18 illustrates a screenshot of an example of a PC optimization view of a global visualization system.

FIG. 18 illustrates an example of a solutions view of a PC optimization data. A user may select a solutions view data such as PC optimization data through the analytics view. The solutions view may include different data for a user to select and/or view. For example, as illustrated in FIG. 18, PC optimization data may include PC deployment across various regions and/or organizational units. Details and/or graphical representations of the data may be obtained by selecting one of the data sets in the solutions view.

Figure 19:
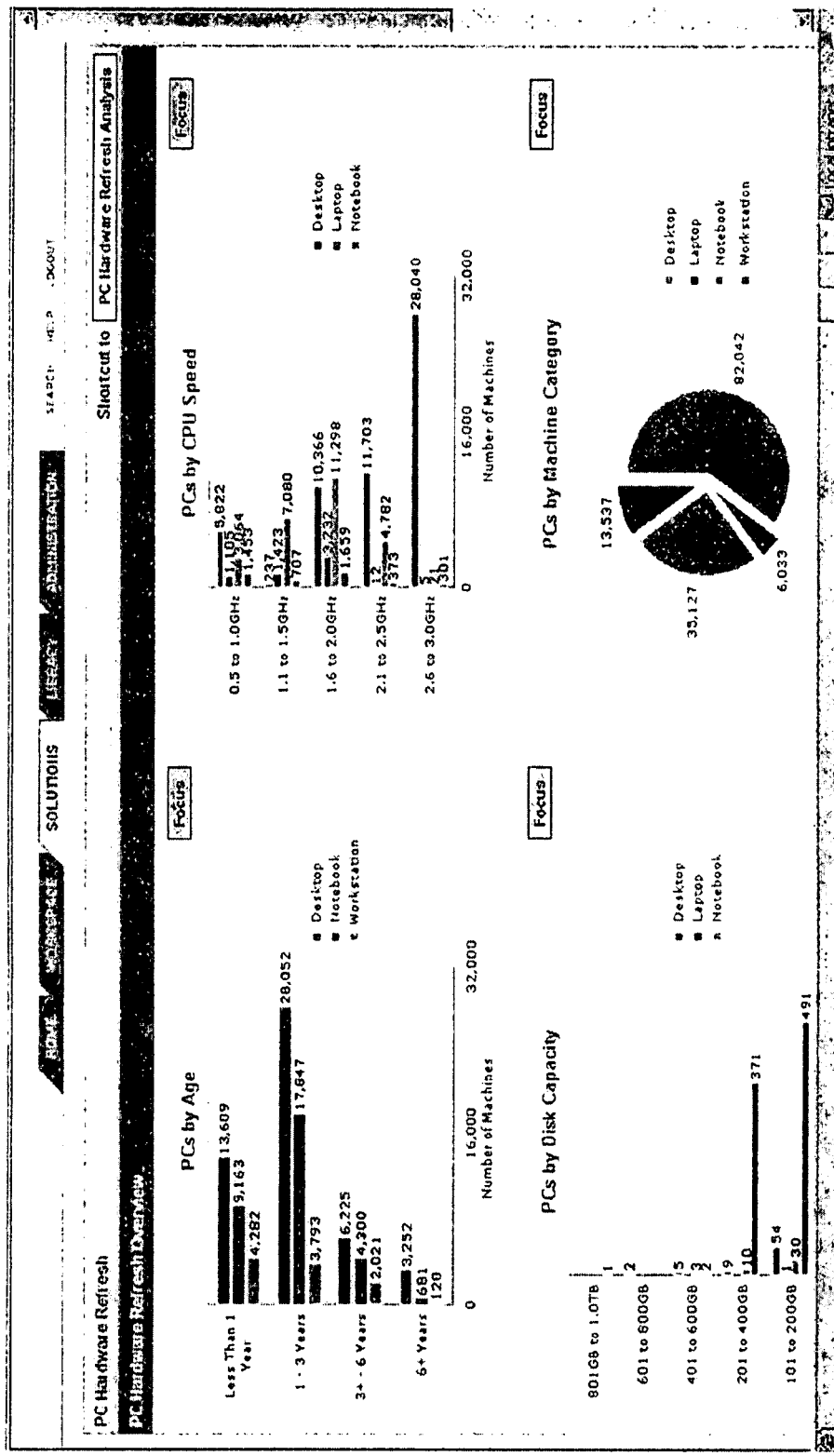
FIG. 19 illustrates a screenshot of an example of a detailed view of PC hardware overview of a global visualization system.

FIG. 19 illustrates an example of four graphical representations of data related to PC Hardware in the field of PC optimization. A user may be able to access age, disk capacity, CPU speeds, and/or machine category for the PCs in a company, a region of the company, and/or a organizational unit of a company. A user may be able to quickly identify problems and/or assess data to optimize PC use in a company by utilizing the graphical representations of various data fields.

Figure 20:
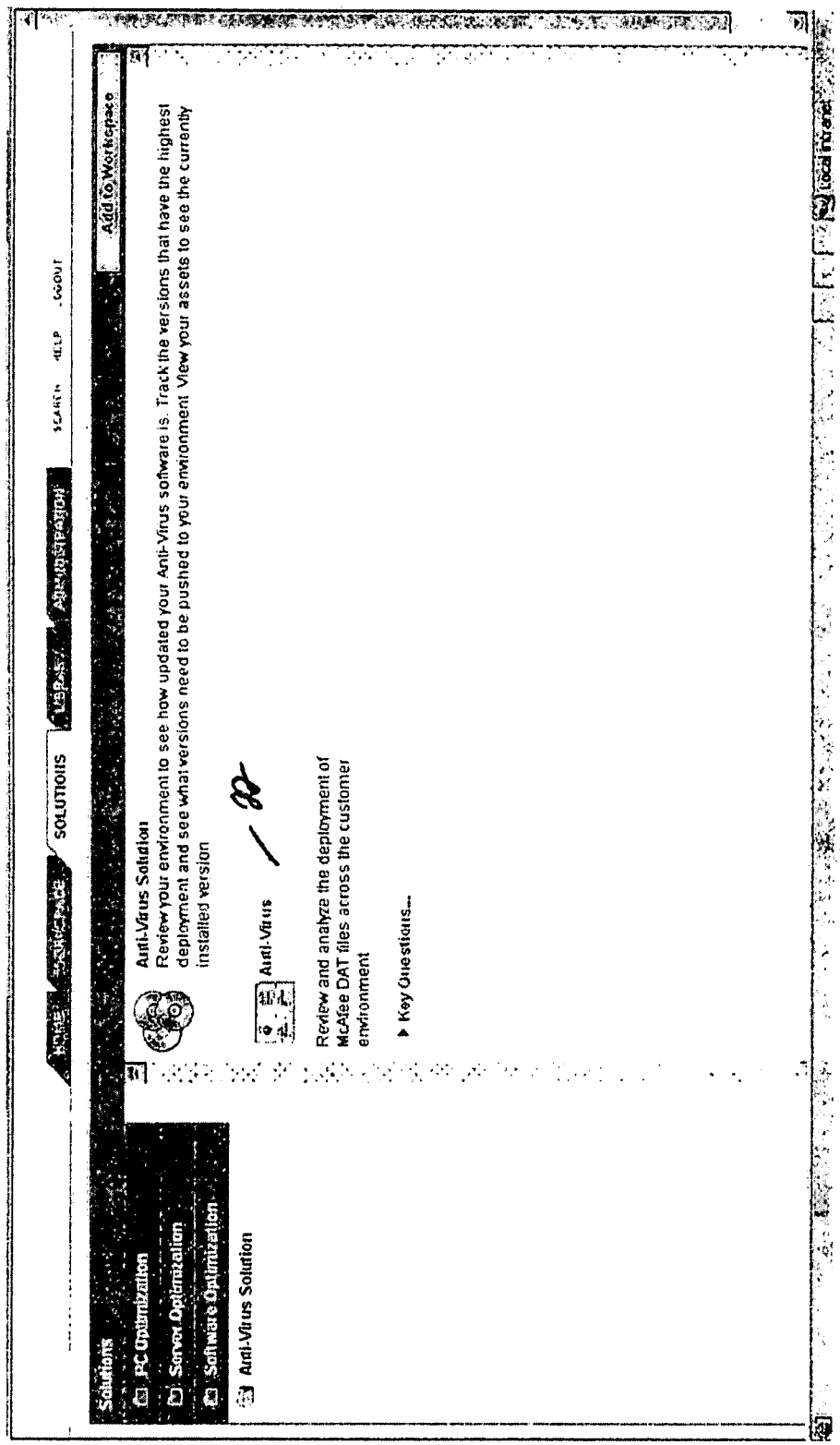
FIG. 20 illustrates a screenshot of an example of an anti-virus solution view of a global visualization system.

FIG. 20 illustrates an example of a solutions view of anti-virus solutions. A user may access a solution view of anti-virus solutions through an analytics view. A user may select a specific solution 22 to view data related to the solution. The data may be displayed graphically and/or in a list. Details of the solution may be displayed when the solution 22 is selected.

Figure 21:
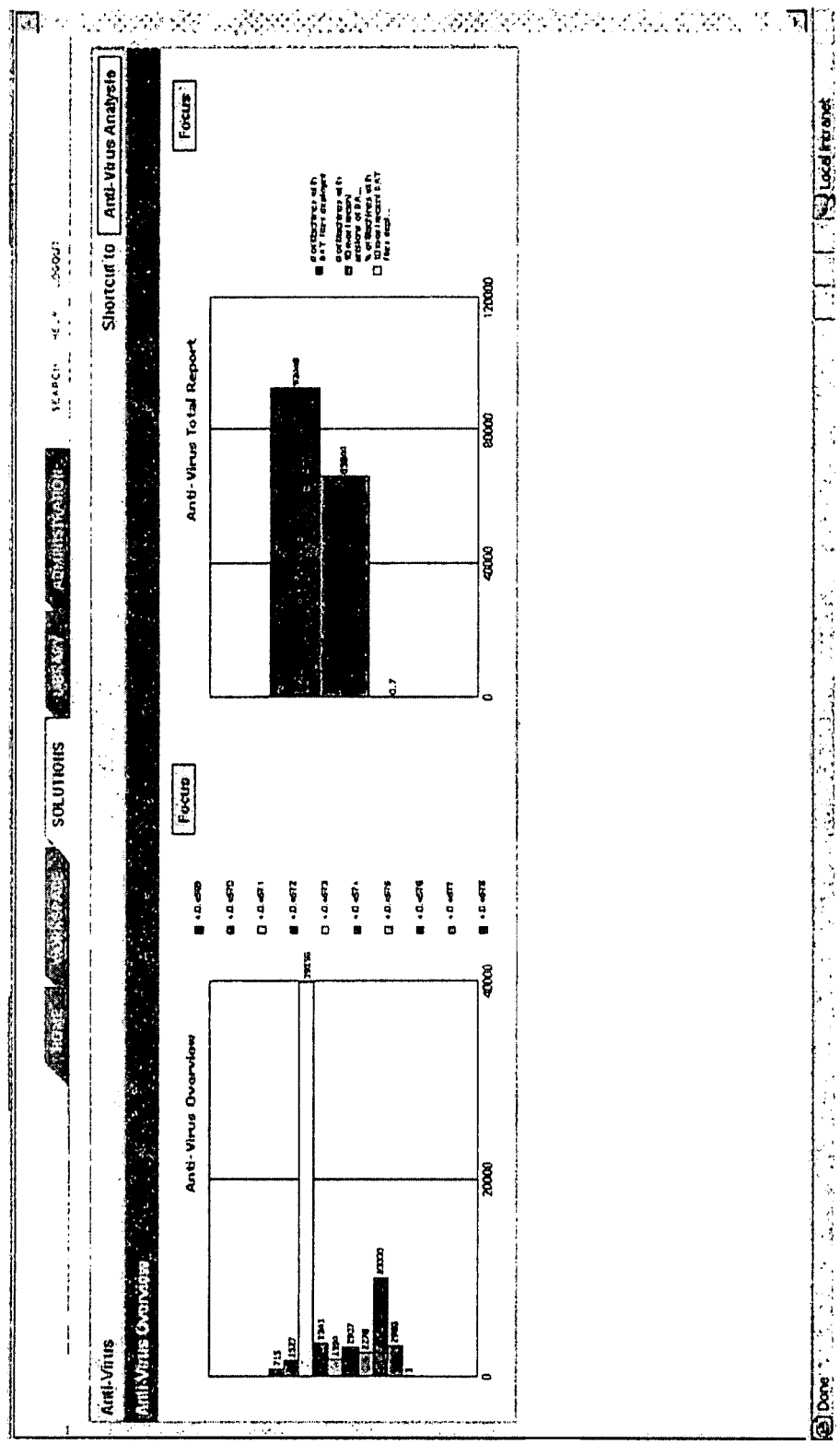
FIG. 21 illustrates a screenshot of an example of a detailed anti-virus view of a global visualization system.

FIG. 21 illustrates an example of a graphical representation of an overview of a solution for anti-virus. A user may analyze the graphical representations to facilitate decision making for the company. A user may analyze the graphical representations to track and/or manage anti-virus problems or solutions.

Figure 22:
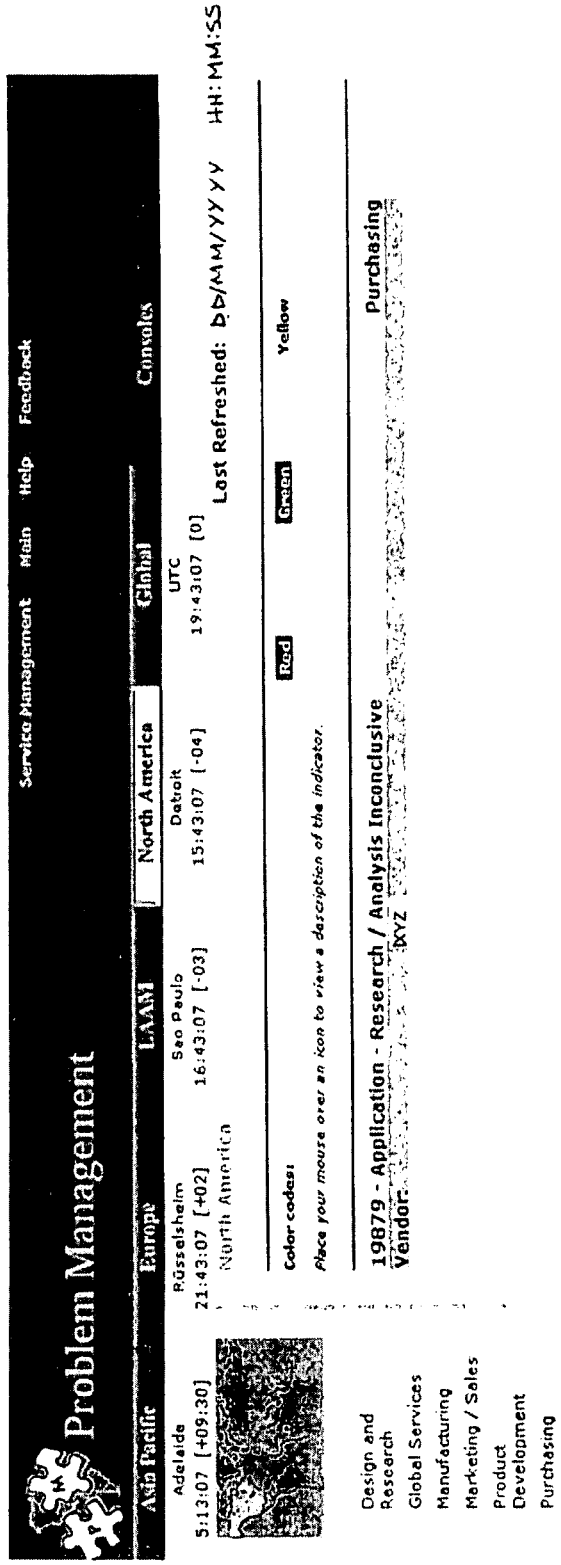
FIG. 22 illustrates a screenshot of an example of a problem management console of a global visualization system.

A global visualization system may include a problem management console. FIG. 22 illustrates an example of a problem management console. A problem management console may facilitate identification of problem-related issues in the company and/or tracking these problems to resolution. A problem management console may provide a summary (e.g., an executive overview) of problem information impacting the company's infrastructure. Utilizing the problem management console, the root cause and/or the preventative actions necessary for a problem may be tracked. Records on the problem management console may be expanded or contracted to display more or less detail as desired by a user.

Contracted views of records in the problem management console may facilitate obtaining an overview of problems in the company or specific regions and/or organizational units of the company. Expanded views of records in the problem management console may provide users with details regarding specific problems and/or provide information needed for decision making by the user. FIG. 23 illustrates an expanded view of the problem management console of FIG. 22. Additional details such as incident location, incident impact, description, region, etc. may be displayed in the expanded view.

A variety of metrics may be accessed through the global visualization system. Metrics may be a useful tool in evaluating a company and or specific regions and/or organizational units of a company. A user may access the metrics though a link 7 in a global summary view and/or a regional summary view. The metrics may be organized by the ITIL (Information Technology Infrastructure Library) process. ITIL is an approach useful in IT Service Management throughout the world. ITIL may provide a cohesive set of best practices, based on public and private sectors internationally.

Figure 24:
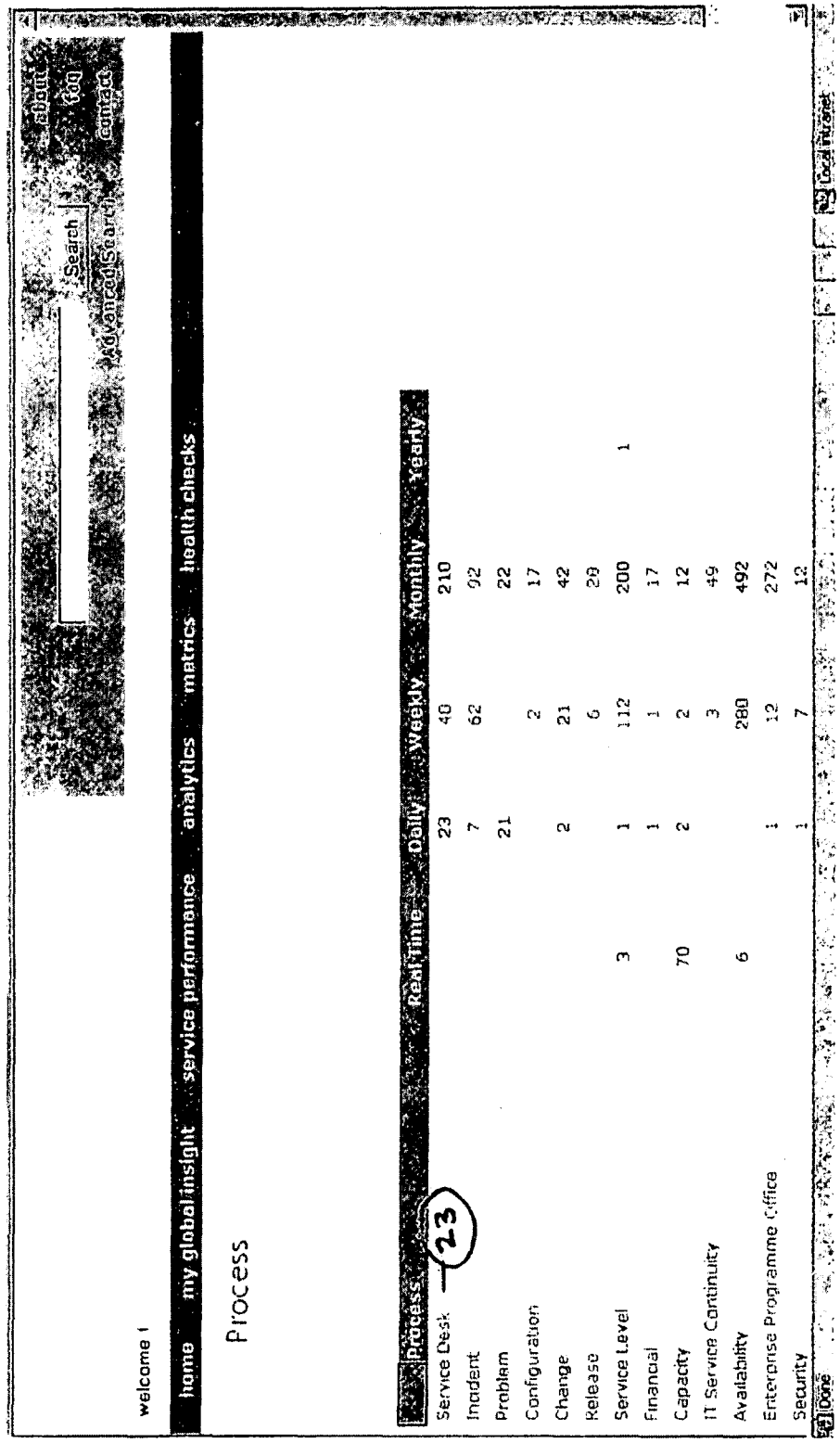
FIG. 24 illustrates a screenshot of an example of a detailed metrics process view of a global visualization system.

FIG. 24 illustrates an example of a process metrics view. Information in a process metrics view may be organized into the quality processes as defined by the ITIL disciplines. Metrics may be organized by, for example, various organizational units of a company (e.g., service desk, incident, problem, configuration, change, release, etc.) and/or regions of a company. A user may be able to customize the organization of metrics displayed. In one implementation, a process metrics view may include a customizable portion that allows a user to select metrics for display.

Metrics may be displayed in real-time and/or as a result of periodic updates. For example, daily, weekly, monthly, and/or yearly metrics and/or reports regarding the metrics may be displayed and/or accessed through the process metrics view. Metrics may show outages in the system. Metrics may be time stamped and/or metrics may be organized sequentially based on time. In one implementation, a user may only be able to access data/metrics based on their role in the organization (e.g., a user's access may be determined by the user's logon information).

FIG. 25 illustrates an example of a service desk metric. A user may, for example, access the service desk metrics by selecting "service desk" from the process metric view (e.g., a user may select service desk 23 from the process metric view in FIG. 22). The service desk may function within the service management console to facilitate completion of user requests according to a company's access rules. A user may select a region 24 to view detailed reports available for the region. In one implementation, a user may select a daily metric field 25 to view specific reports for a region.

Metrics may be organized by organizational units within a company as illustrated in FIG. 26. Metrics may also be organized to display reports identified by a user as important. For example, in FIG. 27 metrics are organized to facilitate access to frequently used and/or company specific categories.

In some implementations, the Web portal may include a service request view. A global summary view, a regional summary view, consoles, and/or other views may include links that allow a user to access the service request view. A user may access a service request view to create a new service request. A service request view may include pre-populated fields to facilitate routing of the service request. For example, a user may select from a drop down menu categories and/or subcategories describing the request.

A Web portal may also include an advanced search view. A global summary view, a regional summary view, consoles, and/or other views may include links that allow a user to access the service request view. A user may select and/or search reports utilizing query fields and/or pre-populated query fields in the advanced search view. For example, a user may select "change request" as the category for the search from drop down menu of a query field.

A user may search reports by date and time of report submission. Reports about reports generated in other views and/or consoles may be created in the advanced search view. For example, a report may be generated to determine compliance with reporting standards (e.g., must file a report every week). In one implementation, after generation of a report regarding compliance with reporting standards, a message may be sent to users who fail to post required reports.

An advance search view may also allow a user to upload and/or post reports. For example, an advance search view may include a portion that allows a user to upload a file (e.g., text, data, spreadsheets, presentations, links to URLs where data is housed, and/or combinations thereof) into a category and/or subcategory of reports. In one implementation, a user's ability to upload reports may be based on the user's role in the company (e.g., only users identified by the company may be able to post reports). Allowing users to directly post reports into the system may streamline the reporting process and/or facilitate compliance with reporting standards.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user by an output device can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Various implementations have been described, and various other implementations have been mentioned or suggested. Furthermore, those skilled in the art will readily appreciate that other implementations are possible while still achieving asset data collection, presentation, and management.

What is claimed is:

1. A computer-implemented method of managing assets for an organization comprising:

generating, by a computer system, a web portal to provide real-time access to asset data across one or more organizations, wherein the asset data comprises information about assets for at least one of the organizations, wherein at least one of said assets comprises a computer, the web portal comprising:

links to service management consoles, wherein selection of a link presents a service management console, and wherein each service management console:

retrieves asset data for a category of service management related to the service management console for a specified time period;

analyzes the asset data; and generates an interface to present the asset data to a user;

a dashboard, wherein the dashboard comprises an interface that includes an overview of asset data, and wherein the dashboard comprises:
  indicia indicative of the status of at least one of incidents related to assets or corrective action related to incidents, wherein the indicia indicative of the status includes at least one of virus compliance indicia and virus vulnerabilities indicia; and
  a report upload interface, wherein the report upload interface allows a user to upload reports related to the asset data;
determining virtual servers assigned to web sites associated with a web server hosting the web portal, wherein users access the web portal through the web sites and different ones of the web sites have different corresponding authentication services;
storing aliases representing assignments of the virtual servers to the web sites;
differentiating the users accessing the web portal based on the web sites through which the users are accessing the web portal; and
authenticating each of the users according to the authentication service corresponding to the web site and the virtual server by which the user is accessing the web portal.

2. The computer-implemented method of claim 1 wherein analyzing the asset data comprises:
  identifying units for the asset data; and
  generating the asset data in similar units.

3. The computer-implemented method of claim 1 further comprising categorizing the asset data for one of the organizations with respect to geographic region that the asset data is related to and presenting the categorized asset data based on geographic region.

4. The computer-implemented method of claim 1 further comprising categorizing the asset data for one of the organizations and presenting the categorized asset data based on geographic region.

5. The computer-implemented method of claim 1 wherein the indicia indicative of the status includes regional changes.

6. The computer-implemented method of claim 1 further comprising restricting access to at least a portion of the asset data based on user information, wherein a user provides user information prior to accessing the web portal.

7. The computer-implemented method of claim 1 further comprising:
  generating a user interface that presents the web portal to a user;
  receiving one or more commands from a user to alter the presentation of asset data in a service management console; and
  altering the presentation of asset data in the user interface.

8. The computer-implemented method of claim 1 wherein the indicia is presented on a map, and wherein the indicia indicates the status for at least one of incidents related to assets or corrective action related to incidents for one or more geographic regions associated with at least one of the organizations.

9. The computer-implemented method of claim 1 further comprising:
  generating a user interface that presents the web portal to a user;
  receiving a selection of a link to one of the service management consoles, wherein the service management console presents asset data related to the service management console, and wherein the asset data is categorized;
  generating a link to one or more of the categories of asset data on the service management console;
  receiving a selection of one of the categories of asset data; and
  generating an interface including a more detailed view of the asset data in the category.

10. The computer-implemented method of claim 1 wherein at least one of the service management consoles comprises:
  an incident management console;
  a problem management console;
  a patch management console;
  a security management console; or
  a service desk console.

11. The computer-implemented method of claim 1, further comprising:
  generating a user interface that presents one of the service management consoles to a user; and
  generating links to one or more other service management consoles in the presented service management console interface.

12. The method of claim 1 further comprising restricting report uploading on the report upload interface based on user information, wherein a user provides user information prior to accessing the web portal.

13. The computer-implemented method of claim 1 further comprising:
  receiving a report from a user through the report upload interface, wherein the report is associated with one of the service management console; and
  storing the report.

14. The computer-implemented method of claim 1 further comprising:
  receiving a search query related to reports;
  analyzing reports accessible in the web portal based on terms of the search query; and
  generating a listing of reports satisfying the search query for presentation to the user.

15. The computer-implemented method of claim 1 further comprising:
  analyzing reports uploaded through the report upload interface to identify users who have not uploaded required reports; and
  transmitting a message to the identified users.

16. The computer-implemented method of claim 1 wherein the web portal provides real-time access to asset data across a plurality of organizations, and further comprising:
  categorizing the asset data based on organization; and
  generating a user interface to present the asset data to a user based on the organization.

17. A system for managing assets for an organization and for providing real-time access to asset data across one or more organizations, wherein the asset data includes information about assets for at least one of the organizations, the system comprising:
  a web server including at least one processor; and
  a web portal hosted by the web server, the web portal comprising:
    links to service management consoles, wherein selection of a link presents a service management console, and wherein each service management consoles:

retrieves asset data for a category of service management related to the service management console and for a specified time period;

analyzes the asset data from said assets, wherein at least one of said assets comprises a computer; and generates an interface to present the asset data to a user;

a dashboard, wherein the dashboard comprises an interface that includes an overview of asset data, and wherein the dashboard comprises:

indicia indicative of the status of at least one of incidents related to assets or corrective action related to incidents, wherein the indicia indicative of the status includes at least one of virus compliance indicia and virus vulnerabilities indicia; and a report upload interface, wherein the report upload interface allows a user to upload reports related to the asset data, wherein the web server is to:

determine virtual servers assigned to web sites associated with the web server, wherein users access the web portal through the web sites and different ones of the web sites have different corresponding authentication services;

store, in a data storage device, aliases representing assignments of the virtual servers to the web sites;

differentiate the users accessing the web portal based on the web sites through which the users are accessing the web portal; and authenticate each of the users according to the authentication service corresponding to the web site and the virtual server by which the user is accessing the web portal.

18. The system of claim 17 wherein the web portal further comprises a user interface for presentation of at least one of the service management consoles.

19. The system of claim 17 wherein at least one of the service management consoles comprise:

an incident management console;

a problem management console;

a patch management console;

a security management console; or a service desk console.

20. The system of claim 17 wherein the web portal further comprises a map, wherein the indicia is presented on a map, and wherein the indicia indicates the status for at least one of incidents related to assets or corrective action related to incidents for one or more geographic regions associated with at least one of the organizations.

\* \* \* \* \*